(12) United States Patent
Hwang et al.

(10) Patent No.: US 10,873,838 B2
(45) Date of Patent: Dec. 22, 2020

(54) METHOD AND APPARATUS FOR TRANSMITTING PSFCH IN NR V2X

(71) Applicant: LG Electronics Inc., Seoul (KR)

(72) Inventors: Daesung Hwang, Seoul (KR); Hanbyul Seo, Seoul (KR); Seungmin Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/824,557

(22) Filed: Mar. 19, 2020

(65) Prior Publication Data

US 2020/0288286 A1    Sep. 10, 2020

Related U.S. Application Data

(63) Continuation of application No. PCT/KR2020/002616, filed on Feb. 24, 2020.

(30) Foreign Application Priority Data

| Mar. 5, 2019 | (KR) | ......................... 10-2019-0025369 |
| Nov. 5, 2019 | (KR) | ......................... 10-2019-0140400 |
| Dec. 26, 2019 | (KR) | ......................... 10-2019-0175512 |

(51) Int. Cl.
*H04W 4/40* (2018.01)
*H04L 1/18* (2006.01)
(Continued)

(52) U.S. Cl.
CPC .............. *H04W 4/40* (2018.02); *H04L 1/1614* (2013.01); *H04L 1/1819* (2013.01);
(Continued)

(58) Field of Classification Search
CPC . H04L 1/1614; H04L 1/1819; H04L 27/2607; H04W 72/02; H04W 4/40
See application file for complete search history.

(56) References Cited

U.S. PATENT DOCUMENTS

| 2019/0044671 A1* | 2/2019 | Novak ................. H04W 52/34 |
| 2019/0052436 A1 | 2/2019 | Desai et al. |

(Continued)

FOREIGN PATENT DOCUMENTS

| KR | 10-2019-0008387 | 1/2019 |

OTHER PUBLICATIONS

3rd Generation Partnership Project; Huawei, HiSilicon, "Sidelink physical layer structure for NR V2X," R1-1901536, 3GPP TSG RAN WG1, Athens, Greece, dated Feb. 25-Mar. 1, 2019, 12 pages.

(Continued)

*Primary Examiner* — Brian D Nguyen
(74) *Attorney, Agent, or Firm* — Fish & Richardson P.C.

(57) ABSTRACT

A method in which a first apparatus performs wireless communication and an apparatus supporting the same are provided. The method may include: receiving information related to a physical sidelink feedback channel (PSFCH) resource from a base station; receiving a physical sidelink shared channel (PSSCH) from a second apparatus; and transmitting a PSFCH related to the PSSCH to the second apparatus. Here, the information related to the PSFCH resource may include, for example, information related to a resource block (RB) available for the first apparatus to transmit the PSFCH.

14 Claims, 26 Drawing Sheets

(51) Int. Cl.
*H04W 72/02* (2009.01)
*H04L 1/16* (2006.01)
*H04L 27/26* (2006.01)
*H04W 92/18* (2009.01)

(52) U.S. Cl.
CPC ......... *H04L 27/2607* (2013.01); *H04W 72/02* (2013.01); *H04W 92/18* (2013.01)

(56) References Cited

U.S. PATENT DOCUMENTS

| | | | |
|---|---|---|---|
| 2019/0159128 A1* | 5/2019 | Lin | H04L 5/0023 |
| 2019/0159153 A1* | 5/2019 | Li | H04W 56/0015 |
| 2020/0099479 A1* | 3/2020 | Park | H04W 72/0413 |
| 2020/0106566 A1* | 4/2020 | Yeo | H04W 28/04 |
| 2020/0127782 A1* | 4/2020 | Tang | H04L 5/0005 |

OTHER PUBLICATIONS

3rd Generation Partnership Project; InterDigital Inc., "Discussion on Physical Layer Structure for NR V2X Sidclink," R1-1902595, 3GPP TSG RAN WG1, Athens, Greece, dated Feb. 25-Mar. 1, 2019, 8 pages.
3rd Generation Partnership Project; Huawei, HiSilicon, "Design and contents of PSCCH and PSFCH," R1-1903071, 3GPP TSG RAN WG1, Athens, Greece, dated Feb. 25-Mar. 1, 2019, 10 pages.
International Search Report in International Appln. No. PCT/KR2020/002616, dated May 28, 2020, 6 pages.

* cited by examiner

METHOD AND APPARATUS FOR TRANSMITTING PSFCH IN NR V2X

CROSS-REFERENCE TO RELATED APPLICATIONS

Pursuant to 35 U.S.C. § 119(e), this application is a continuation of International Application No. PCT/KR2020/002616, with an international filing date of Feb. 24, 2020, which claims the benefit of Korean Patent Application No. 10-2019-0025369, filed on Mar. 5, 2019, No. 10-2019-0140400, filed on Nov. 5, 2019 and No. 10-2019-0175512, filed on Dec. 26, 2019, the contents of which are all hereby incorporated by reference herein in their entirety.

BACKGROUND OF THE INVENTION

Field of the Invention

This disclosure relates to a wireless communication system.

Related Art

Sidelink (SL) communication is a communication scheme in which a direct link is established between User Equipments (UEs) and the UEs exchange voice and data directly with each other without intervention of an evolved Node B (eNB). SL communication is under consideration as a solution to the overhead of an eNB caused by rapidly increasing data traffic.

Vehicle-to-everything (V2X) refers to a communication technology through which a vehicle exchanges information with another vehicle, a pedestrian, an object having an infrastructure (or infra) established therein, and so on. The V2X may be divided into 4 types, such as vehicle-to-vehicle (V2V), vehicle-to-infrastructure (V2I), vehicle-to-network (V2N), and vehicle-to-pedestrian (V2P). The V2X communication may be provided via a PC5 interface and/or Uu interface.

Meanwhile, as a wider range of communication devices require larger communication capacities, the need for mobile broadband communication that is more enhanced than the existing Radio Access Technology (RAT) is rising. Accordingly, discussions are made on services and user equipment (UE) that are sensitive to reliability and latency. And, a next generation radio access technology that is based on the enhanced mobile broadband communication, massive Machine Type Communication (MTC), Ultra-Reliable and Low Latency Communication (URLLC), and so on, may be referred to as a new radio access technology (RAT) or new radio (NR). Herein, the NR may also support vehicle-to-everything (V2X) communication.

FIG. 1 is a drawing for describing V2X communication based on NR, compared to V2X communication based on RAT used before NR. The embodiment of FIG. 1 may be combined with various embodiments of the present disclosure.

Regarding V2X communication, a scheme of providing a safety service, based on a V2X message such as Basic Safety Message (BSM), Cooperative Awareness Message (CAM), and Decentralized Environmental Notification Message (DENM) is focused in the discussion on the RAT used before the NR. The V2X message may include position information, dynamic information, attribute information, or the like. For example, a UE may transmit a periodic message type CAM and/or an event triggered message type DENM to another UE.

For example, the CAM may include dynamic state information of the vehicle such as direction and speed, static data of the vehicle such as a size, and basic vehicle information such as an exterior illumination state, route details, or the like. For example, the UE may broadcast the CAM, and latency of the CAM may be less than 100 ms. For example, the UE may generate the DENM and transmit it to another UE in an unexpected situation such as a vehicle breakdown, accident, or the like. For example, all vehicles within a transmission range of the UE may receive the CAM and/or the DENM. In this case, the DENM may have a higher priority than the CAM.

Thereafter, regarding V2X communication, various V2X scenarios are proposed in NR. For example, the various V2X scenarios may include vehicle platooning, advanced driving, extended sensors, remote driving, or the like.

For example, based on the vehicle platooning, vehicles may move together by dynamically forming a group. For example, in order to perform platoon operations based on the vehicle platooning, the vehicles belonging to the group may receive periodic data from a leading vehicle. For example, the vehicles belonging to the group may decrease or increase an interval between the vehicles by using the periodic data.

For example, based on the advanced driving, the vehicle may be semi-automated or fully automated. For example, each vehicle may adjust trajectories or maneuvers, based on data obtained from a local sensor of a proximity vehicle and/or a proximity logical entity. In addition, for example, each vehicle may share driving intention with proximity vehicles.

For example, based on the extended sensors, raw data, processed data, or live video data obtained through the local sensors may be exchanged between a vehicle, a logical entity, a UE of pedestrians, and/or a V2X application server. Therefore, for example, the vehicle may recognize a more improved environment than an environment in which a self-sensor is used for detection.

For example, based on the remote driving, for a person who cannot drive or a remote vehicle in a dangerous environment, a remote driver or a V2X application may operate or control the remote vehicle. For example, if a route is predictable such as public transportation, cloud computing based driving may be used for the operation or control of the remote vehicle. In addition, for example, an access for a cloud-based back-end service platform may be considered for the remote driving.

Meanwhile, a scheme of specifying service requirements for various V2X scenarios such as vehicle platooning, advanced driving, extended sensors, remote driving, or the like is discussed in NR-based V2X communication.

SUMMARY OF THE INVENTION

According to resource design or resource management for a PSFCH, when different PSCCHs/PSSCHs are transmitted via non-overlapping resources, different PSFCHs corresponding to the different PSCCHs/PSSCHs also need to be transmitted via non-overlapping resources. However, in order to achieve this aspect, the number of reserved PSFCH resources may be increased, and flexibility in resource utilization of a network may be limited in some cases. Therefore, it is necessary to propose a method for efficiently configuring a resource for a PSFCH.

According to an embodiment, there is provided a method in which a first apparatus performs wireless communication. The method may include: receiving information related to a physical sidelink feedback channel (PSFCH) resource from a base station; receiving a physical sidelink shared channel (PSSCH) from a second apparatus; and transmitting a PSFCH related to the PSSCH to the second apparatus. Here, the information related to the PSFCH resource may include, for example, information related to a resource block (RB) available for the first apparatus to transmit the PSFCH.

According to an embodiment, there is provided a first apparatus for performing wireless communication. The first apparatus may include: one or more memories storing instructions; one or more transceivers; and one or more processors connected to the one or more memories and the one or more transceivers. The one or more processors may execute the instructions to: receive information related to a physical sidelink feedback channel (PSFCH) resource from a base station; receive a physical sidelink shared channel (PSSCH) from a second apparatus; and transmit a PSFCH related to the PSSCH to the second apparatus. Here, the information related to the PSFCH resource may include, for example, information related to a resource block (RB) available for the first apparatus to transmit the PSFCH.

A UE may efficiently perform SL communication.

DESCRIPTION OF EXEMPLARY EMBODIMENTS

Figure 1:
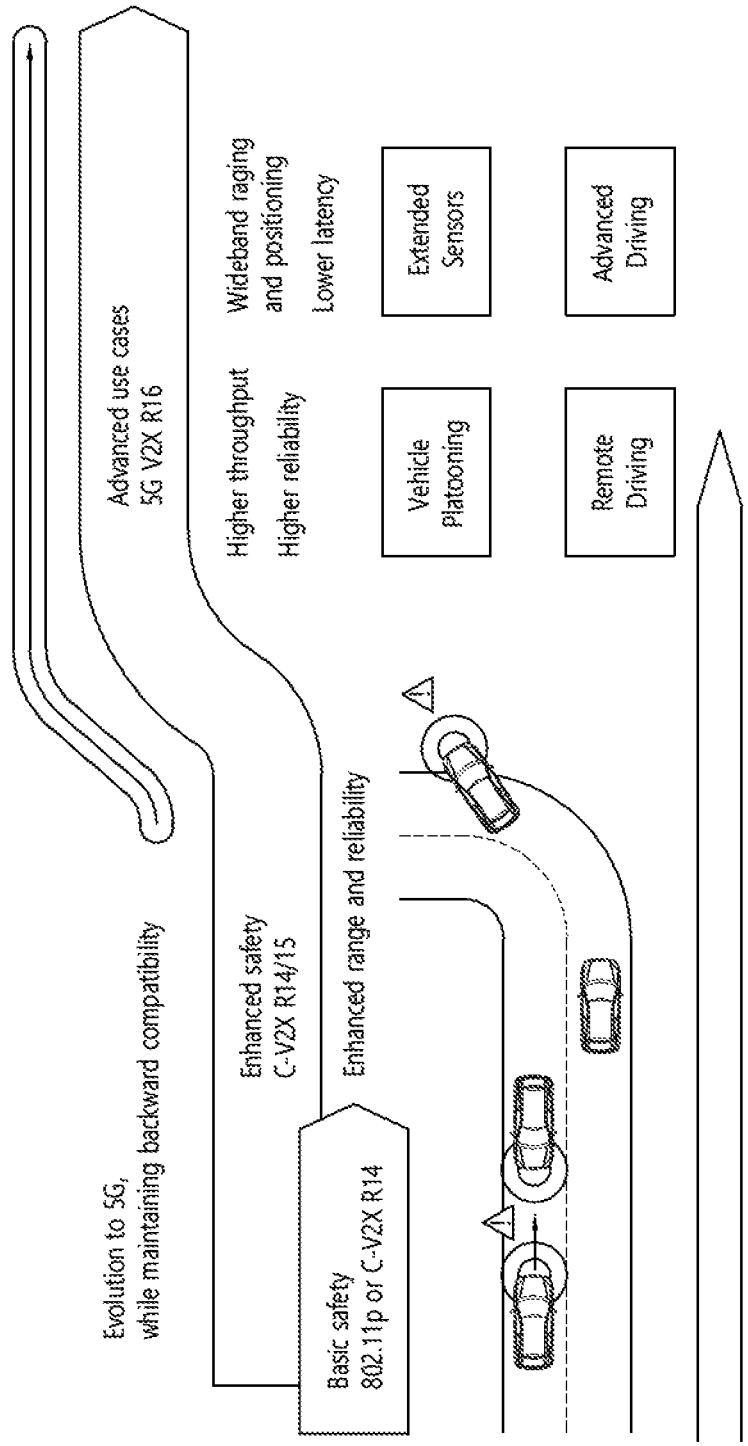
FIG. 1 is a drawing for describing V2X communication based on NR, compared to V2X communication based on RAT used before NR.

In the present specification, "A or B" may mean "only A", "only B" or "both A and B." In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (PDCCH)", it may mean that "PDCCH" is proposed as an example of the "control information". In other words, the "control information" of the present specification is not limited to "PDCCH", and "PDDCH" may be proposed as an example of the "control information". In addition, when indicated as "control information (i.e., PDCCH)", it may also mean that "PDCCH" is proposed as an example of the "control information".

A technical feature described individually in one figure in the present specification may be individually implemented, or may be simultaneously implemented.

The technology described below may be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), and so on. The CDMA may be implemented with a radio technology, such as universal terrestrial radio access (UTRA) or CDMA-2000. The TDMA may be implemented with a radio technology, such as global system for mobile communications (GSM)/general packet ratio service (GPRS)/enhanced data rate for GSM evolution (EDGE). The OFDMA may be implemented with a radio technology, such as institute of electrical and electronics engineers (IEEE) 802.11 (Wi-Fi), IEEE 802.16 (WiMAX), IEEE 802.20, evolved UTRA (E-UTRA), and so on. IEEE 802.16m is an evolved version of IEEE 802.16e and provides backward compatibility with a system based on the IEEE 802.16e. The UTRA is part of a universal mobile telecommunication system (UMTS). 3rd generation partnership project (3GPP) long term evolution (LTE) is part of an evolved UMTS (E-UMTS) using the E-UTRA. The 3GPP LTE uses the OFDMA in a downlink and uses the SC-FDMA in an uplink. LTE-advanced (LTE-A) is an evolution of the LTE.

5G NR is a successive technology of LTE-A corresponding to a new Clean-slate type mobile communication system having the characteristics of high performance, low latency, high availability, and so on. 5G NR may use resources of all spectrum available for usage including low frequency bands of less than 1 GHz, middle frequency bands ranging from 1 GHz to 10 GHz, high frequency (millimeter waves) of 24 GHz or more, and so on.

For clarity in the description, the following description will mostly focus on LTE-A or 5G NR. However, technical features according to an embodiment of the present disclosure will not be limited only to this.

Figure 2:
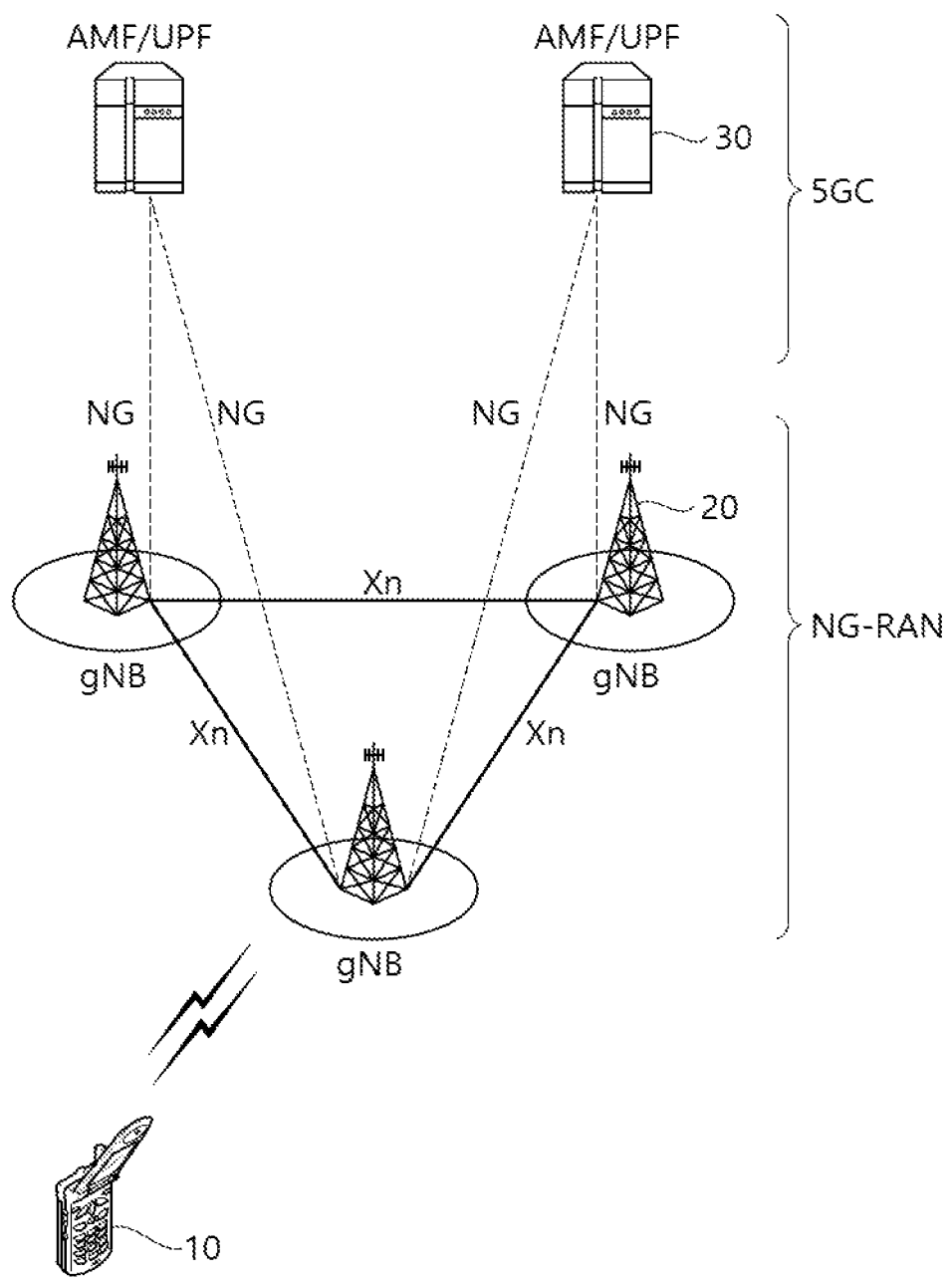
FIG. 2 shows a structure of an NR system, in accordance with an embodiment of the present disclosure.

FIG. 2 shows a structure of an NR system, in accordance with an embodiment of the present disclosure. The embodiment of FIG. 2 may be combined with various embodiments of the present disclosure.

Referring to FIG. 2, a next generation-radio access network (NG-RAN) may include a BS 20 providing a UE 10 with a user plane and control plane protocol termination. For example, the BS 20 may include a next generation-Node B (gNB) and/or an evolved-NodeB (eNB). For example, the UE 10 may be fixed or mobile and may be referred to as other terms, such as a mobile station (MS), a user terminal (UT), a subscriber station (SS), a mobile terminal (MT), wireless device, and so on. For example, the BS may be referred to as a fixed station which communicates with the UE 10 and may be referred to as other terms, such as a base transceiver system (BTS), an access point (AP), and so on.

The embodiment of FIG. 2 exemplifies a case where only the gNB is included. The BSs 20 may be connected to one another via Xn interface. The BS 20 may be connected to one another via 5th generation (5G) core network (5GC) and NG interface. More specifically, the BSs 20 may be connected to an access and mobility management function (AMF) 30 via NG-C interface, and may be connected to a user plane function (UPF) 30 via NG-U interface.

Figure 3:
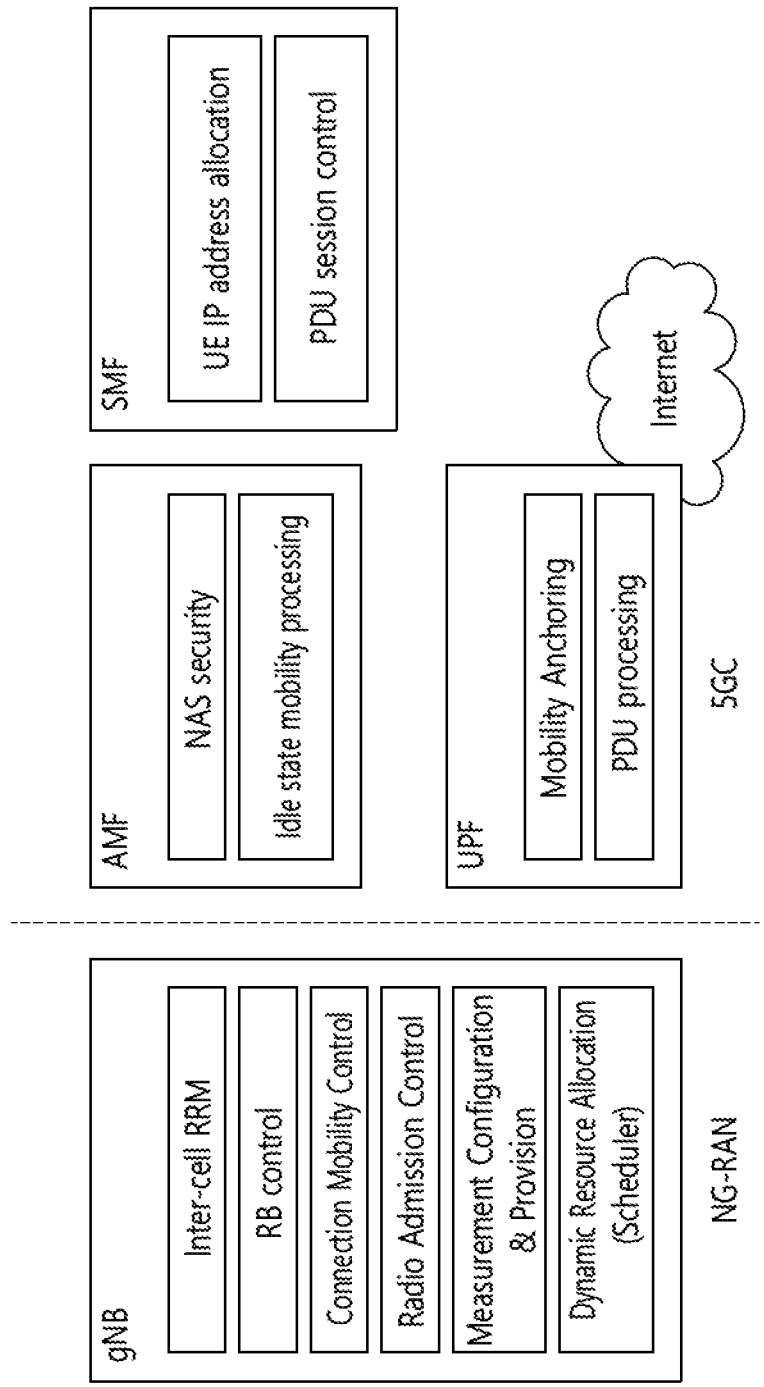
FIG. 3 shows a functional division between an NG-RAN and a 5GC, in accordance with an embodiment of the present disclosure.

FIG. 3 shows a functional division between an NG-RAN and a 5GC, in accordance with an embodiment of the present disclosure.

Referring to FIG. 3, the gNB may provide functions, such as Inter Cell Radio Resource Management (RRM), Radio Bearer (RB) control, Connection Mobility Control, Radio Admission Control, Measurement Configuration & Provision, Dynamic Resource Allocation, and so on. An AMF may provide functions, such as Non Access Stratum (NAS) security, idle state mobility processing, and so on. A UPF may provide functions, such as Mobility Anchoring, Protocol Data Unit (PDU) processing, and so on. A Session Management Function (SMF) may provide functions, such as user equipment (UE) Internet Protocol (IP) address allocation, PDU session control, and so on.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 4A:
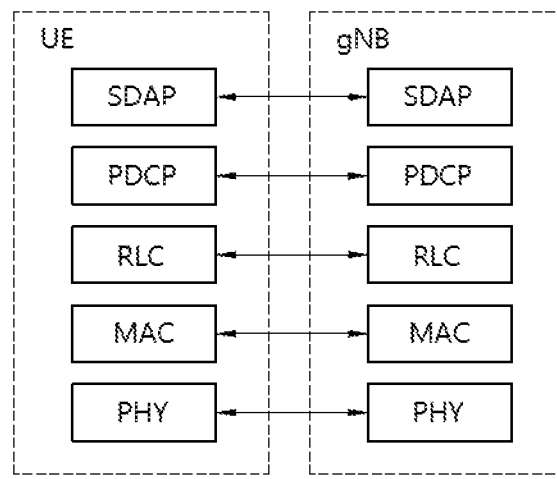
FIGS. 4A and 4B show a radio protocol architecture, in accordance with an embodiment of the present disclosure.
Figure 4B:
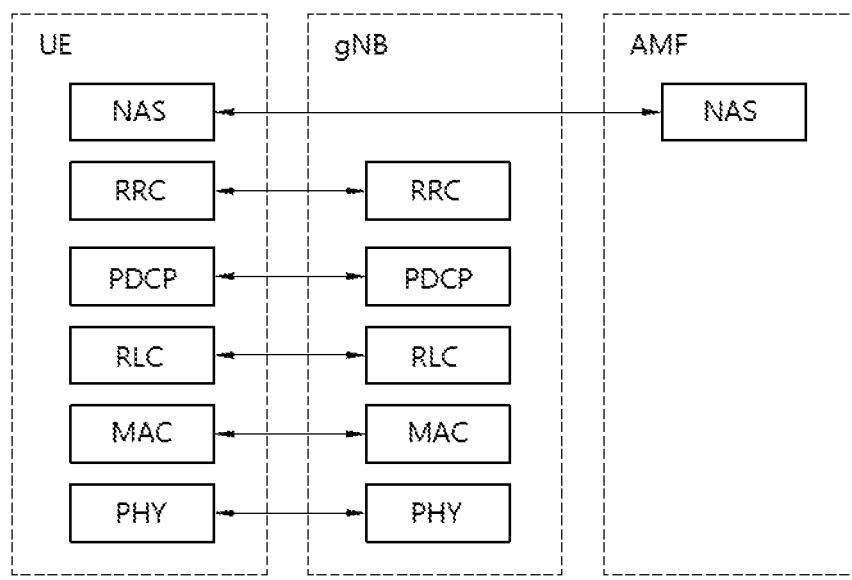

FIGS. 4A and 4B show a radio protocol architecture, in accordance with an embodiment of the present disclosure. The embodiment of FIGS. 4A and 4B may be combined with various embodiments of the present disclosure. Specifically, FIG. 4A shows a radio protocol architecture for a user plane, and FIG. 4B shows a radio protocol architecture for a control plane. The user plane corresponds to a protocol stack for user data transmission, and the control plane corresponds to a protocol stack for control signal transmission.

Referring to FIGS. 4A and 4B, a physical layer provides an upper layer with an information transfer service through a physical channel. The physical layer is connected to a medium access control (MAC) layer which is an upper layer of the physical layer through a transport channel. Data is transferred between the MAC layer and the physical layer through the transport channel. The transport channel is classified according to how and with what characteristics data is transmitted through a radio interface.

Between different physical layers, i.e., a physical layer of a transmitter and a physical layer of a receiver, data are transferred through the physical channel. The physical channel is modulated using an orthogonal frequency division multiplexing (OFDM) scheme, and utilizes time and frequency as a radio resource.

The MAC layer provides services to a radio link control (RLC) layer, which is a higher layer of the MAC layer, via a logical channel. The MAC layer provides a function of mapping multiple logical channels to multiple transport channels. The MAC layer also provides a function of logical channel multiplexing by mapping multiple logical channels to a single transport channel. The MAC layer provides data transfer services over logical channels.

The RLC layer performs concatenation, segmentation, and reassembly of Radio Link Control Service Data Unit (RLC SDU). In order to ensure diverse quality of service (QoS) required by a radio bearer (RB), the RLC layer provides three types of operation modes, i.e., a transparent mode (TM), an unacknowledged mode (UM), and an acknowledged mode (AM). An AM RLC provides error correction through an automatic repeat request (ARQ).

A radio resource control (RRC) layer is defined only in the control plane. The RRC layer serves to control the logical channel, the transport channel, and the physical channel in association with configuration, reconfiguration and release of RBs. The RB is a logical path provided by the first layer (i.e., the physical layer or the PHY layer) and the second layer (i.e., the MAC layer, the RLC layer, and the packet data convergence protocol (PDCP) layer) for data delivery between the UE and the network.

Functions of a packet data convergence protocol (PDCP) layer in the user plane include user data delivery, header compression, and ciphering. Functions of a PDCP layer in the control plane include control-plane data delivery and ciphering/integrity protection.

A service data adaptation protocol (SDAP) layer is defined only in a user plane. The SDAP layer performs mapping between a Quality of Service (QoS) flow and a data radio bearer (DRB) and QoS flow ID (QFI) marking in both DL and UL packets.

The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the E-UTRAN, the UE is in an RRC_CONNECTED state, and, otherwise, the UE may be in an RRC_IDLE state. In case of the NR, an RRC_INACTIVE state is additionally defined, and a UE being in the RRC_INACTIVE state may maintain its connection with a core network whereas its connection with the BS is released.

Data is transmitted from the network to the UE through a downlink transport channel. Examples of the downlink transport channel include a broadcast channel (BCH) for transmitting system information and a downlink-shared channel (SCH) for transmitting user traffic or control messages. Traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several sub-carriers in a frequency domain. One sub-frame includes a plurality of OFDM symbols in the time domain. A resource block is a unit of resource allocation, and consists of a plurality of OFDM symbols and a plurality of sub-carriers. Further, each subframe may use specific sub-carriers of specific OFDM symbols (e.g., a first OFDM symbol) of a corresponding subframe for a physical downlink control channel (PDCCH), i.e., an L1/L2 control channel. A transmission time interval (TTI) is a unit time of subframe transmission.

Figure 5:
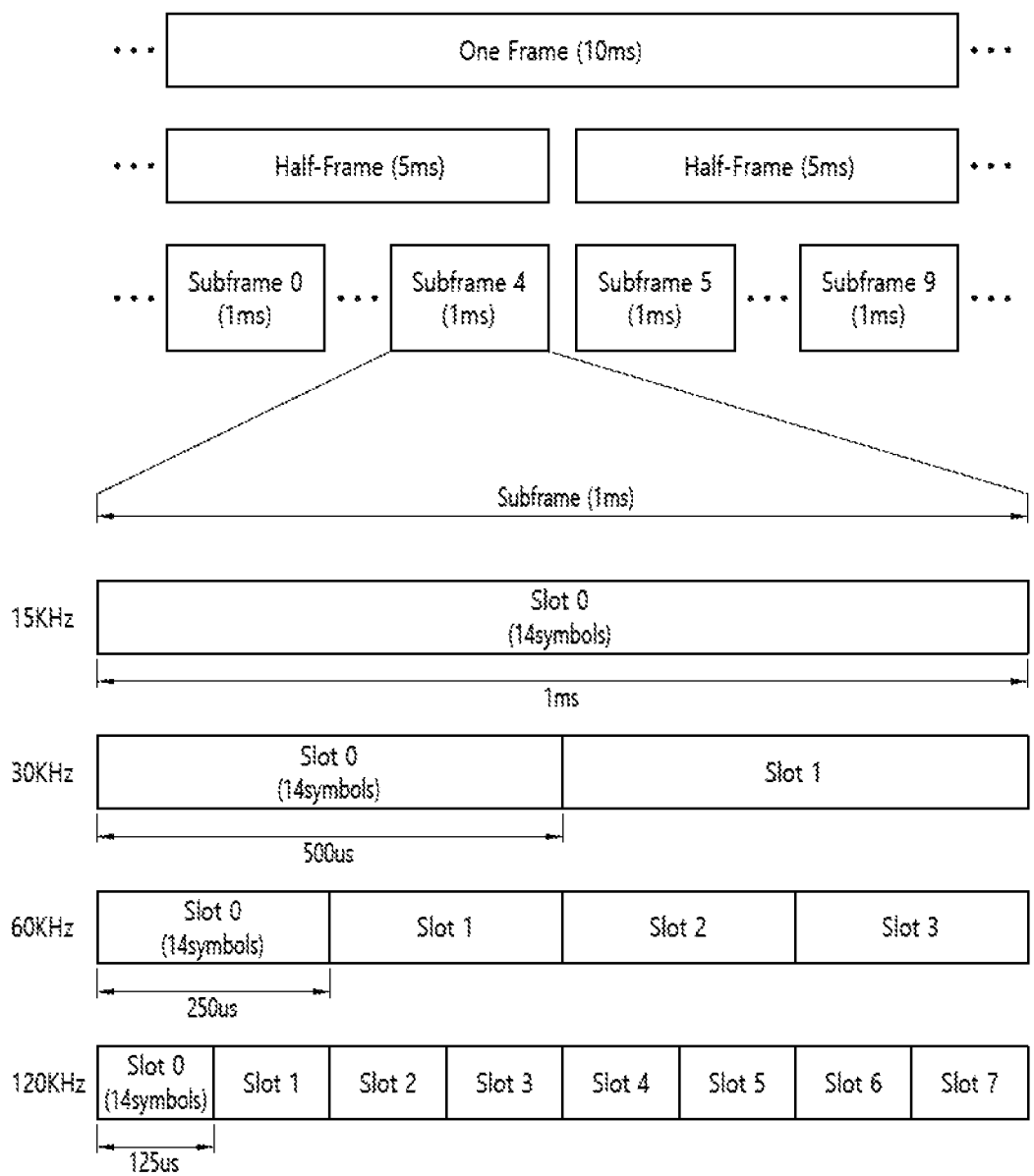
FIG. 5 shows a structure of an NR system, in accordance with an embodiment of the present disclosure.

FIG. 5 shows a structure of an NR system, in accordance with an embodiment of the present disclosure. The embodiment of FIG. 5 may be combined with various embodiments of the present disclosure.

Referring to FIG. 5, in the NR, a radio frame may be used for performing uplink and downlink transmission. A radio frame has a length of 10 ms and may be defined to be configured of two half-frames (HFs). A half-frame may include five 1 ms subframes (SFs). A subframe (SF) may be divided into one or more slots, and the number of slots within a subframe may be determined in accordance with subcarrier spacing (SCS). Each slot may include 12 or 14 OFDM(A) symbols according to a cyclic prefix (CP).

In case of using a normal CP, each slot may include 14 symbols. In case of using an extended CP, each slot may include 12 symbols. Herein, a symbol may include an OFDM symbol (or CP-OFDM symbol) and a Single Carrier-FDMA (SC-FDMA) symbol (or Discrete Fourier Transform-spread-OFDM (DFT-s-OFDM) symbol).

Table 1 shown below represents an example of a number of symbols per slot ($N^{slot}_{symb}$), a number slots per frame ($N^{frame,u}_{slot}$), and a number of slots per subframe ($N^{subframe,u}_{slot}$) in accordance with an SCS configuration (u), in a case where a normal CP is used.

TABLE 1

| SCS (15 * $2^u$) | $N^{slot}_{symb}$ | $N^{frame,u}_{slot}$ | $N^{subframe,u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

Table 2 shows an example of a number of symbols per slot, a number of slots per frame, and a number of slots per subframe in accordance with the SCS, in a case where an extended CP is used.

TABLE 2

| SCS (15 * $2^u$) | $N^{slot}_{symb}$ | $N^{frame,u}_{slot}$ | $N^{subframe,u}_{slot}$ |
|---|---|---|---|
| 60 KHz (u = 2) | 12 | 40 | 4 |

In an NR system, OFDM(A) numerologies (e.g., SCS, CP length, and so on) between multiple cells being integrate to one UE may be differently configured. Accordingly, a (absolute time) duration (or section) of a time resource (e.g., subframe, slot or TTI) (collectively referred to as a time unit (TU) for simplicity) being configured of the same number of symbols may be differently configured in the integrated cells.

In the NR, multiple numerologies or SCSs for supporting diverse 5G services may be supported. For example, in case an SCS is 15 kHz, a wide area of the conventional cellular bands may be supported, and, in case an SCS is 30 kHz/60 kHz a dense-urban, lower latency, wider carrier bandwidth may be supported. In case the SCS is 60 kHz or higher, a bandwidth that is greater than 24.25 GHz may be used in order to overcome phase noise.

An NR frequency band may be defined as two different types of frequency ranges. The two different types of frequency ranges may be FR1 and FR2. The values of the frequency ranges may be changed (or varied), and, for example, the two different types of frequency ranges may be as shown below in Table A3. Among the frequency ranges that are used in an NR system, FR1 may mean a "sub 6 GHz range", and FR2 may mean an "above 6 GHz range" and may also be referred to as a millimeter wave (mmW).

TABLE 3

| Frequency Range designation | Corresponding frequency range | Subcarrier Spacing (SCS) |
|---|---|---|
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table A4, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 mat include an unlicensed band. The unlicensed band may be used for diverse purposes, e.g., the unlicensed band for vehicle-specific communication (e.g., automated driving).

TABLE 4

| Frequency Range designation | Corresponding frequency range | Subcarrier Spacing (SCS) |
|---|---|---|
| FR1 | 410 MHz-7125 MHz | 15, 30, 60 kHz |
| FR2 | 24250 MHz-52600 MHz | 60, 120, 240 kHz |

Figure 6:
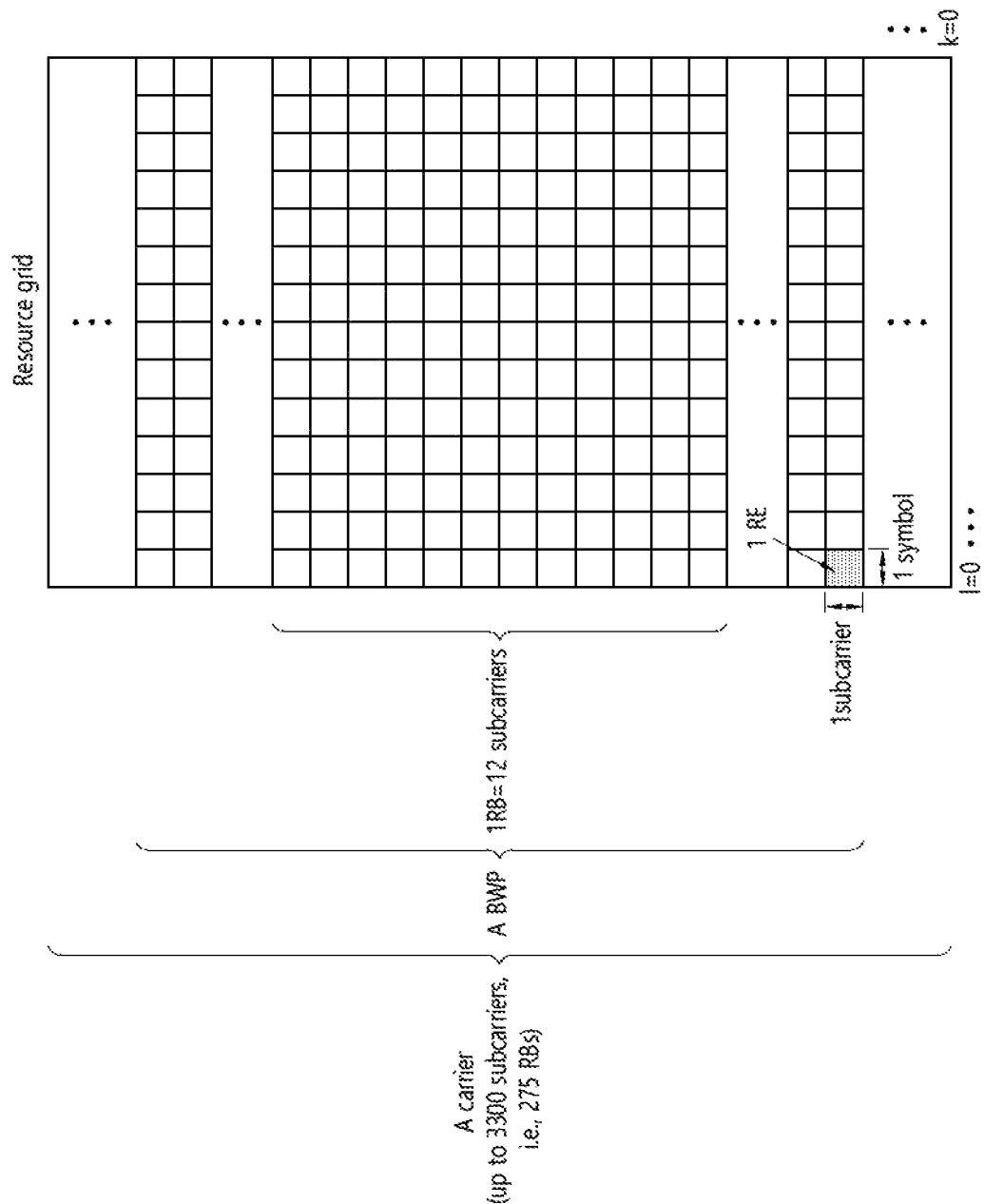
FIG. 6 shows a structure of a slot of an NR frame, in accordance with an embodiment of the present disclosure.

FIG. 6 shows a structure of a slot of an NR frame, in accordance with an embodiment of the present disclosure.

Referring to FIG. 6, a slot includes a plurality of symbols in a time domain. For example, in case of a normal CP, one slot may include 14 symbols. However, in case of an extended CP, one slot may include 12 symbols. Alternatively, in case of a normal CP, one slot may include 7 symbols. However, in case of an extended CP, one slot may include 6 symbols.

A carrier includes a plurality of subcarriers in a frequency domain. A Resource Block (RB) may be defined as a plurality of consecutive subcarriers (e.g., 12 subcarriers) in the frequency domain. A Bandwidth Part (BWP) may be defined as a plurality of consecutive (Physical) Resource Blocks ((P)RBs) in the frequency domain, and the BWP may correspond to one numerology (e.g., SCS, CP length, and so on). A carrier may include a maximum of N number BWPs (e.g., 5 BWPs). Data communication may be performed via an activated BWP. Each element may be referred to as a Resource Element (RE) within a resource grid and one complex symbol may be mapped to each element.

Meanwhile, a radio interface between a UE and another UE or a radio interface between the UE and a network may consist of an L1 layer, an L2 layer, and an L3 layer. In various embodiments of the present disclosure, the L1 layer may imply a physical layer. In addition, for example, the L2 layer may imply at least one of a MAC layer, an RLC layer, a PDCP layer, and an SDAP layer. In addition, for example, the L3 layer may imply an RRC layer.

Hereinafter, a bandwidth part (BWP) and a carrier will be described.

The BWP may be a set of consecutive physical resource blocks (PRBs) in a given numerology. The PRB may be selected from consecutive sub-sets of common resource blocks (CRBs) for the given numerology on a given carrier.

When using bandwidth adaptation (BA), a reception bandwidth and transmission bandwidth of a UE are not necessarily as large as a bandwidth of a cell, and the reception bandwidth and transmission bandwidth of the BS may be adjusted. For example, a network/BS may inform the UE of bandwidth adjustment. For example, the UE receive information/configuration for bandwidth adjustment from the network/BS. In this case, the UE may perform bandwidth adjustment based on the received information/configuration. For example, the bandwidth adjustment may include an increase/decrease of the bandwidth, a position change of the bandwidth, or a change in subcarrier spacing of the bandwidth.

For example, the bandwidth may be decreased during a period in which activity is low to save power. For example, the position of the bandwidth may move in a frequency domain. For example, the position of the bandwidth may move in the frequency domain to increase scheduling flexibility. For example, the subcarrier spacing of the bandwidth may be changed. For example, the subcarrier spacing of the bandwidth may be changed to allow a different service. A subset of a total cell bandwidth of a cell may be called a bandwidth part (BWP). The BA may be performed when the BS/network configures the BWP to the UE and the BS/network informs the UE of the BWP currently in an active state among the configured BWPs.

For example, the BWP may be at least any one of an active BWP, an initial BWP, and/or a default BWP. For example, the UE may not monitor downlink radio link quality in a DL BWP other than an active DL BWP on a primary cell (PCell). For example, the UE may not receive PDCCH, PDSCH, or CSI-RS (excluding RRM) outside the active DL BWP. For example, the UE may not trigger a channel state information (CSI) report for the inactive DL BWP. For example, the UE may not transmit PUCCH or PUSCH outside an active UL BWP. For example, in a downlink case, the initial BWP may be given as a consecutive RB set for an RMSI CORESET (configured by PBCH). For example, in an uplink case, the initial BWP may be given by SIB for a random access procedure. For example, the default BWP may be configured by a higher layer. For example, an initial value of the default BWP may be an initial DL BWP. For energy saving, if the UE fails to detect DCI during a specific period, the UE may switch the active BWP of the UE to the default BWP.

Meanwhile, the BWP may be defined for SL. The same SL BWP may be used in transmission and reception. For example, a transmitting UE may transmit an SL channel or an SL signal on a specific BWP, and a receiving UE may receive the SL channel or the SL signal on the specific BWP. In a licensed carrier, the SL BWP may be defined separately from a Uu BWP, and the SL BWP may have configuration signaling separate from the Uu BWP. For example, the UE may receive a configuration for the SL BWP from the BS/network. The SL BWP may be (pre-)configured in a carrier with respect to an out-of-coverage NR V2X UE and an RRC_IDLE UE. For the UE in the RRC_CONNECTED mode, at least one SL BWP may be activated in the carrier.

Figure 7:
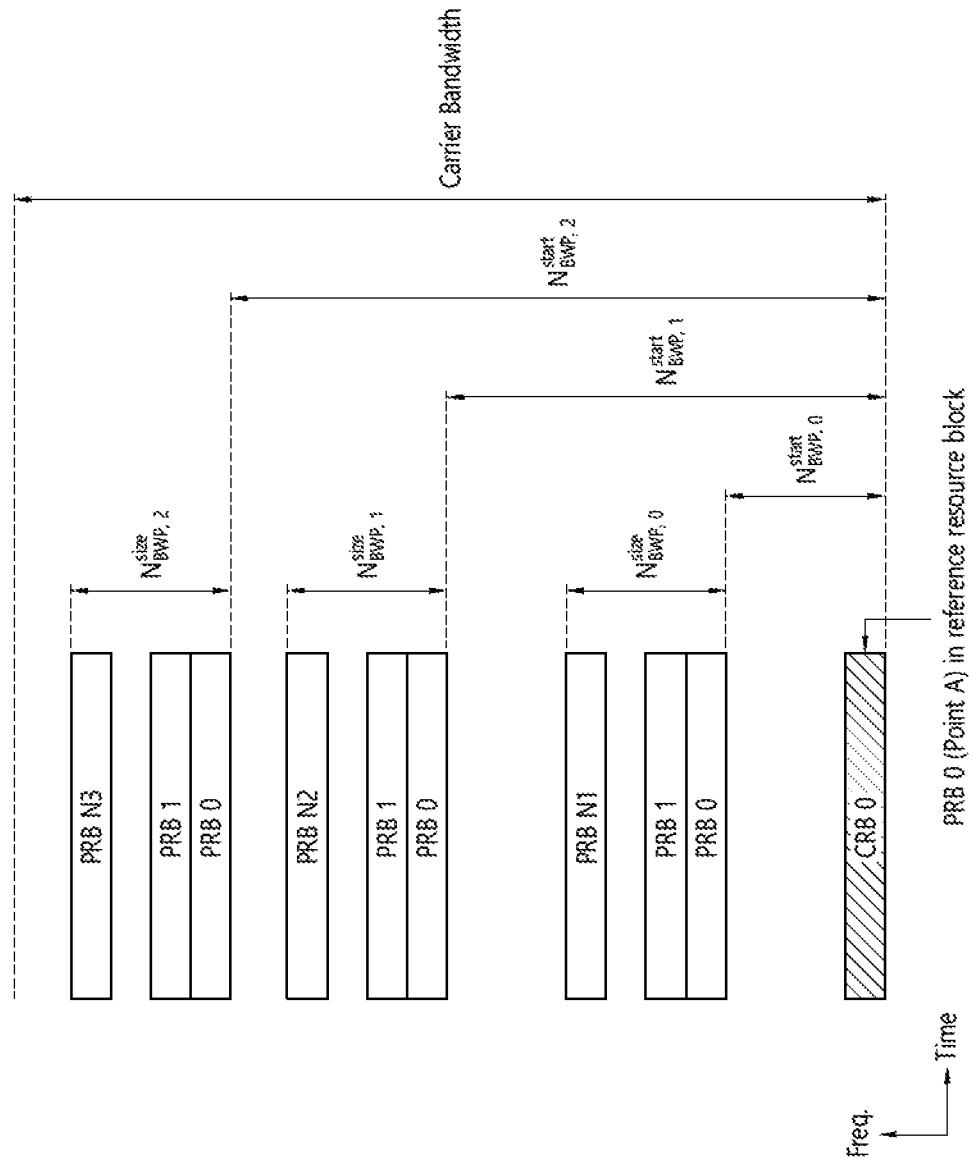
FIG. 7 shows an example of a BWP, in accordance with an embodiment of the present disclosure.

FIG. 7 shows an example of a BWP, in accordance with an embodiment of the present disclosure. The embodiment of FIG. 7 may be combined with various embodiments of the present disclosure. It is assumed in the embodiment of FIG. 7 that the number of BWPs is 3.

Referring to FIG. 7, a common resource block (CRB) may be a carrier resource block numbered from one end of a carrier band to the other end thereof. In addition, the PRB may be a resource block numbered within each BWP. A point A may indicate a common reference point for a resource block grid.

The BWP may be configured by a point A, an offset $N^{start}_{BWP}$ from the point A, and a bandwidth $N^{size}_{BWP}$. For example, the point A may be an external reference point of a PRB of a carrier in which a subcarrier 0 of all numerologies (e.g., all numerologies supported by a network on that carrier) is aligned. For example, the offset may be a PRB interval between a lowest subcarrier and the point A in a given numerology. For example, the bandwidth may be the number of PRBs in the given numerology.

Hereinafter, V2X or SL communication will be described.

Figure 8A:
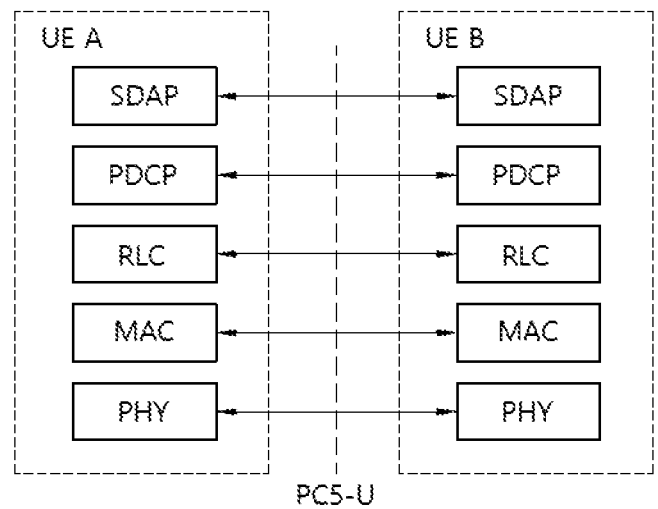
FIGS. 8A and 8B show a radio protocol architecture for a SL communication, in accordance with an embodiment of the present disclosure.
Figure 8B:
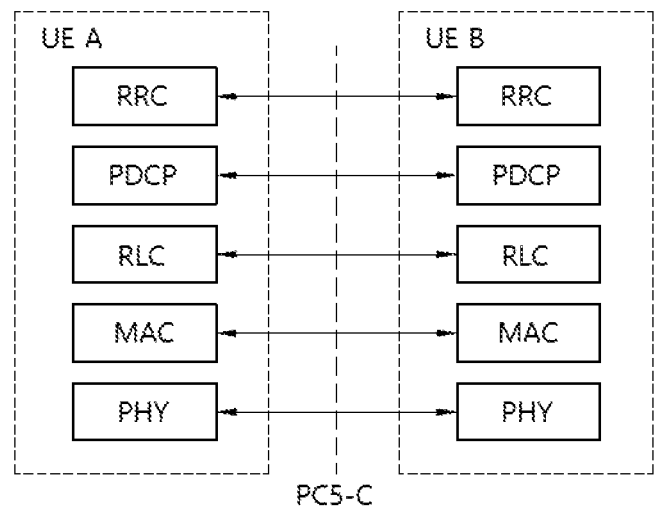

FIGS. 8A and 8B show a radio protocol architecture for a SL communication, in accordance with an embodiment of the present disclosure. The embodiment of FIGS. 8A and 8B may be combined with various embodiments of the present disclosure. More specifically, FIG. 8A shows a user plane protocol stack, and FIG. 8B shows a control plane protocol stack.

Hereinafter, a sidelink synchronization signal (SLSS) and synchronization information will be described.

The SLSS may include a primary sidelink synchronization signal (PSSS) and a secondary sidelink synchronization signal (SSSS), as an SL-specific sequence. The PSSS may be referred to as a sidelink primary synchronization signal (S-PSS), and the SSSS may be referred to as a sidelink secondary synchronization signal (S-SSS). For example, length-127 M-sequences may be used for the S-PSS, and length-127 gold sequences may be used for the S-SSS. For example, a UE may use the S-PSS for initial signal detection and for synchronization acquisition. For example, the UE may use the S-PSS and the S-SSS for acquisition of detailed synchronization and for detection of a synchronization signal ID.

A physical sidelink broadcast channel (PSBCH) may be a (broadcast) channel for transmitting default (system) information which must be first known by the UE before SL signal transmission/reception. For example, the default information may be information related to SLSS, a duplex mode (DM), a time division duplex (TDD) uplink/downlink (UL/DL) configuration, information related to a resource pool, a type of an application related to the SLSS, a subframe offset, broadcast information, or the like. For example, for evaluation of PSBCH performance, in NR V2X, a payload size of the PSBCH may be 56 bits including 24-bit CRC.

The S-PSS, the S-SSS, and the PSBCH may be included in a block format (e.g., SL synchronization signal (SS)/PSBCH block, hereinafter, sidelink-synchronization signal block (S-SSB)) supporting periodical transmission. The S-SSB may have the same numerology (i.e., SCS and CP length) as a physical sidelink control channel (PSCCH)/physical sidelink shared channel (PSSCH) in a carrier, and a transmission bandwidth may exist within a (pre-)configured sidelink (SL) BWP. For example, the S-SSB may have a bandwidth of 11 resource blocks (RBs). For example, the PSBCH may exist across 11 RBs. In addition, a frequency position of the S-SSB may be (pre-)configured. Accordingly, the UE does not have to perform hypothesis detection at frequency to discover the S-SSB in the carrier.

Figure 9:
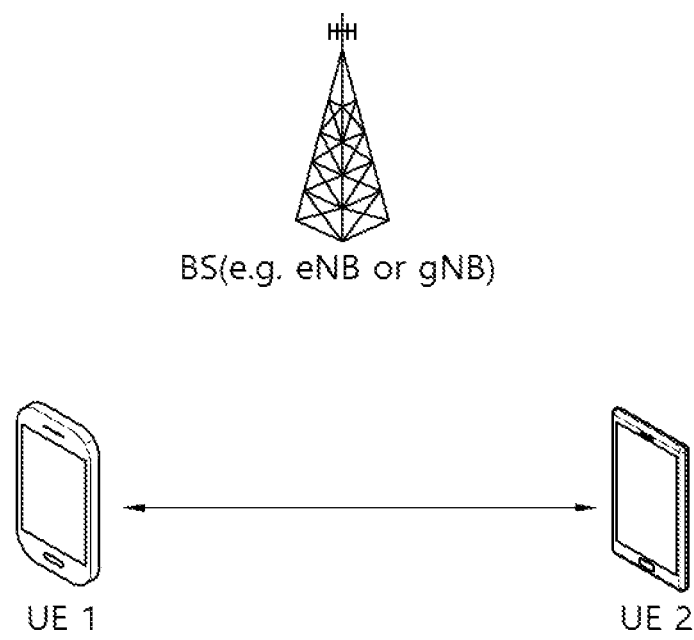
FIG. 9 shows a UE performing V2X or SL communication, in accordance with an embodiment of the present disclosure.

FIG. 9 shows a UE performing V2X or SL communication, in accordance with an embodiment of the present disclosure. The embodiment of FIG. 9 may be combined with various embodiments of the present disclosure.

Referring to FIG. 9, in V2X or SL communication, the term 'UE' may generally imply a UE of a user. However, if a network equipment such as a BS transmits/receives a signal according to a communication scheme between UEs, the BS may also be regarded as a sort of the UE. For example, a UE 1 may be a first apparatus 100, and a UE 2 may be a second apparatus 200.

For example, the UE 1 may select a resource unit corresponding to a specific resource in a resource pool which implies a set of series of resources. In addition, the UE 1 may transmit an SL signal by using the resource unit. For example, a resource pool in which the UE 1 is capable of transmitting a signal may be configured to the UE 2 which is a receiving UE, and the signal of the UE 1 may be detected in the resource pool.

Herein, if the UE 1 is within a connectivity range of the BS, the BS may inform the UE 1 of the resource pool. Otherwise, if the UE 1 is out of the connectivity range of the BS, another UE may inform the UE 1 of the resource pool, or the UE 1 may use a pre-configured resource pool.

In general, the resource pool may be configured in unit of a plurality of resources, and each UE may select a unit of one or a plurality of resources to use it in SL signal transmission thereof.

Hereinafter, resource allocation in SL will be described.

Figure 10B:
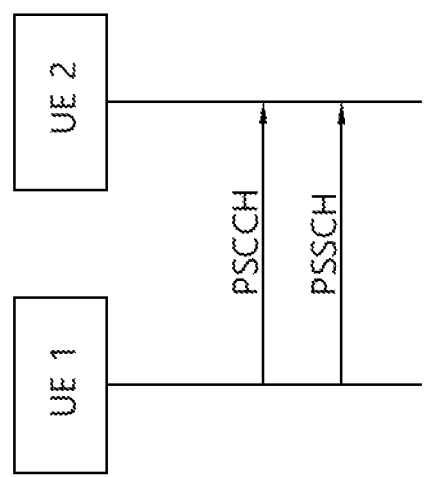
FIGS. 10A and 10B show a procedure of performing V2X or SL communication by a UE based on a transmission mode, in accordance with an embodiment of the present disclosure.
Figure 10A:
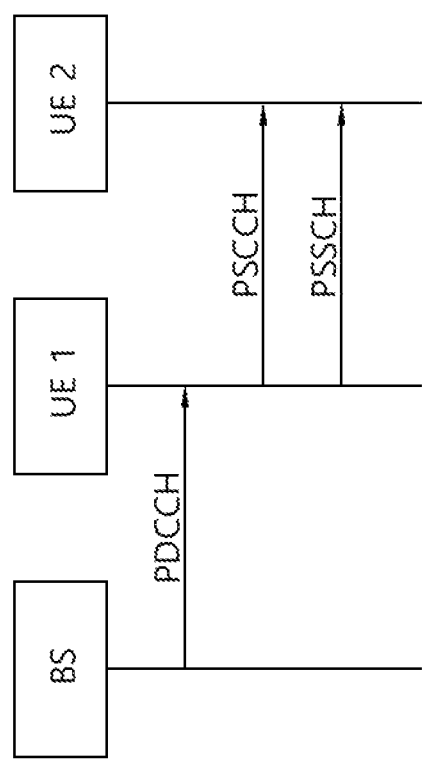

FIGS. 10A and 10B show a procedure of performing V2X or SL communication by a UE based on a transmission mode, in accordance with an embodiment of the present disclosure. The embodiment of FIGS. 10A and 10B may be combined with various embodiments of the present disclosure. In various embodiments of the present disclosure, the transmission mode may be called a mode or a resource allocation mode. Hereinafter, for convenience of explanation, in LTE, the transmission mode may be called an LTE transmission mode. In NR, the transmission mode may be called an NR resource allocation mode.

For example, FIG. 10A shows a UE operation related to an LTE transmission mode 1 or an LTE transmission mode 3. Alternatively, for example, FIG. 10A shows a UE operation related to an NR resource allocation mode 1. For example, the LTE transmission mode 1 may be applied to general SL communication, and the LTE transmission mode 3 may be applied to V2X communication.

For example, FIG. 10B shows a UE operation related to an LTE transmission mode 2 or an LTE transmission mode 4. Alternatively, for example, FIG. 10B shows a UE operation related to an NR resource allocation mode 2.

Referring to FIG. 10A, in the LTE transmission mode 1, the LTE transmission mode 3, or the NR resource allocation mode 1, a BS may schedule an SL resource to be used by the UE for SL transmission. For example, the BS may perform resource scheduling to a UE 1 through a PDCCH (more specifically, downlink control information (DCI)), and the UE 1 may perform V2X or SL communication with respect to a UE 2 according to the resource scheduling. For example, the UE 1 may transmit a sidelink control information (SCI) to the UE 2 through a physical sidelink control channel (PSCCH), and thereafter transmit data based on the SCI to the UE 2 through a physical sidelink shared channel (PSSCH).

Referring to FIG. 10B, in the LTE transmission mode 2, the LTE transmission mode 4, or the NR resource allocation mode 2, the UE may determine an SL transmission resource within an SL resource configured by a BS/network or a pre-configured SL resource. For example, the configured SL resource or the pre-configured SL resource may be a resource pool. For example, the UE may autonomously select or schedule a resource for SL transmission. For example, the UE may perform SL communication by autonomously selecting a resource within a configured resource pool. For example, the UE may autonomously select a resource within a selective window by performing a sensing and resource (re)selection procedure. For example, the sensing may be performed in unit of subchannels. In addition, the UE 1 which has autonomously selected the resource within the resource pool may transmit the SCI to the UE 2 through a PSCCH, and thereafter may transmit data based on the SCI to the UE 2 through a PSSCH.

Figure 11C:
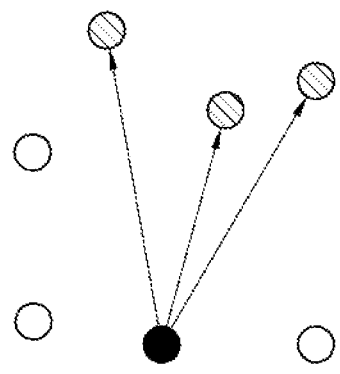
FIGS. 11A to 11C show three cast types, in accordance with an embodiment of the present disclosure.
Figure 11B:
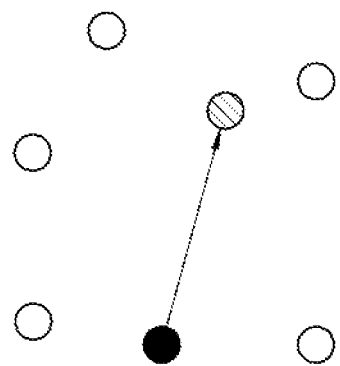
Figure 11A:
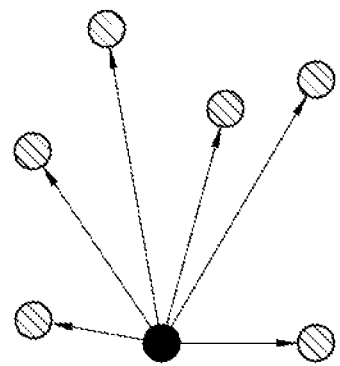

FIGS. 11A to 11C show three cast types, in accordance with an embodiment of the present disclosure. The embodiment of FIGS. 11A to 11C may be combined with various embodiments of the present disclosure. Specifically, FIG. 11A shows broadcast-type SL communication, FIG. 11B shows unicast type-SL communication, and FIG. 11C shows groupcast-type SL communication. In case of the unicast-type SL communication, a UE may perform one-to-one communication with respect to another UE. In case of the groupcast-type SL transmission, the UE may perform SL communication with respect to one or more UEs in a group to which the UE belongs. In various embodiments of the present disclosure, SL groupcast communication may be replaced with SL multicast communication, SL one-to-many communication, or the like.

Hereinafter, a hybrid automatic repeat request (HARQ) procedure will be described.

An error compensation scheme is used to secure communication reliability. Examples of the error compensation scheme may include a forward error correction (FEC) scheme and an automatic repeat request (ARQ) scheme. In the FEC scheme, errors in a receiving end are corrected by attaching an extra error correction code to information bits. The FEC scheme has an advantage in that time delay is small and no information is additionally exchanged between a transmitting end and the receiving end but also has a disadvantage in that system efficiency deteriorates in a good channel environment. The ARQ scheme has an advantage in that transmission reliability can be increased but also has a disadvantage in that a time delay occurs and system efficiency deteriorates in a poor channel environment.

A hybrid automatic repeat request (HARQ) scheme is a combination of the FEC scheme and the ARQ scheme. In the HARQ scheme, it is determined whether an unrecoverable error is included in data received by a physical layer, and retransmission is requested upon detecting the error, thereby improving performance.

In case of SL unicast and groupcast, HARQ feedback and HARQ combining in the physical layer may be supported. For example, when a receiving UE operates in a resource allocation mode 1 or 2, the receiving UE may receive the PSSCH from a transmitting UE, and the receiving UE may transmit HARQ feedback in response to the PSSCH to the transmitting UE by using a sidelink feedback control information (SFCI) format through a physical sidelink feedback channel (PSFCH).

For example, the SL HARQ feedback may be enabled for unicast. In this case, in a non-code block group (non-CBG) operation, if the receiving UE decodes a PSCCH of which a target is the receiving UE and if the receiving UE successfully decodes a transport block related to the PSCCH, the receiving UE may generate HARQ-ACK. In addition, the receiving UE may transmit the HARQ-ACK to the transmitting UE. Otherwise, if the receiving UE cannot successfully decode the transport block after decoding the PSCCH of which the target is the receiving UE, the receiving UE may generate the HARQ-NACK. In addition, the receiving UE may transmit HARQ-NACK to the transmitting UE.

For example, the SL HARQ feedback may be enabled for groupcast. For example, in the non-CBG operation, two HARQ feedback options may be supported for groupcast.

(1) Groupcast option 1: After the receiving UE decodes the PSCCH of which the target is the receiving UE, if the receiving UE fails in decoding of a transport block related to the PSCCH, the receiving UE may transmit HARQ-NACK to the transmitting UE through a PSFCH. Otherwise, if the receiving UE decodes the PSCCH of which the target is the receiving UE and if the receiving UE successfully decodes the transport block related to the PSCCH, the receiving UE may not transmit the HARQ-ACK to the transmitting UE.

(2) Groupcast option 2: After the receiving UE decodes the PSCCH of which the target is the receiving UE, if the receiving UE fails in decoding of the transport block related to the PSCCH, the receiving UE may transmit HARQ-NACK to the transmitting UE through the PSFCH. In addition, if the receiving UE decodes the PSCCH of which the target is the receiving UE and if the receiving UE successfully decodes the transport block related to the PSCCH, the receiving UE may transmit the HARQ-ACK to the transmitting UE through the PSFCH.

For example, if the groupcast option 1 is used in the SL HARQ feedback, all UEs performing groupcast communication may share a PSFCH resource. For example, UEs belonging to the same group may transmit HARQ feedback by using the same PSFCH resource.

For example, if the groupcast option 2 is used in the SL HARQ feedback, each UE performing groupcast communication may use a different PSFCH resource for HARQ feedback transmission. For example, UEs belonging to the same group may transmit HARQ feedback by using different PSFCH resources.

For example, when the SL HARQ feedback is enabled for groupcast, the receiving UE may determine whether to transmit the HARQ feedback to the transmitting UE based on a transmission-reception (TX-RX) distance and/or RSRP.

For example, in the groupcast option 1, in case of the TX-RX distance-based HARQ feedback, if the TX-RX distance is less than or equal to a communication range requirement, the receiving UE may transmit HARQ feedback in response to the PSSCH to the transmitting UE. Otherwise, if the TX-RX distance is greater than the communication range requirement, the receiving UE may not transmit the HARQ feedback in response to the PSSCH to the transmitting UE. For example, the transmitting UE may inform the receiving UE of a location of the transmitting UE through SCI related to the PSSCH. For example, the SCI related to the PSSCH may be second SCI. For example, the receiving UE may estimate or obtain the TX-RX distance based on a location of the receiving UE and the location of the transmitting UE. For example, the receiving UE may decode the SCI related to the PSSCH and thus may know the communication range requirement used in the PSSCH.

For example, in case of the resource allocation mode 1, a time (offset) between the PSFCH and the PSSCH may be configured or pre-configured. In case of unicast and groupcast, if retransmission is necessary on SL, this may be indicated to a BS by an in-coverage UE which uses the PUCCH. The transmitting UE may transmit an indication to a serving BS of the transmitting UE in a form of scheduling request (SR)/buffer status report (BSR), not a form of HARQ ACK/NACK. In addition, even if the BS does not receive the indication, the BS may schedule an SL retransmission resource to the UE. For example, in case of the resource allocation mode 2, a time (offset) between the PSFCH and the PSSCH may be configured or pre-configured.

For example, from a perspective of UE transmission in a carrier, TDM between the PSCCH/PSSCH and the PSFCH may be allowed for a PSFCH format for SL in a slot. For example, a sequence-based PSFCH format having a single symbol may be supported. Herein, the single symbol may not an AGC duration. For example, the sequence-based PSFCH format may be applied to unicast and groupcast.

For example, in a slot related to a resource pool, a PSFCH resource may be configured periodically as N slot durations, or may be pre-configured. For example, N may be configured as one or more values greater than or equal to 1. For example, N may be 1, 2, or 4. For example, HARQ feedback for transmission in a specific resource pool may be transmitted only through a PSFCH on the specific resource pool.

For example, if the transmitting UE transmits the PSSCH to the receiving UE across a slot # X to a slot # N, the receiving UE may transmit HARQ feedback in response to the PSSCH to the transmitting UE in a slot # (N+A). For example, the slot # (N+A) may include a PSFCH resource. Herein, for example, A may be a smallest integer greater than or equal to K. For example, K may be the number of logical slots. In this case, K may be the number of slots in a resource pool. Alternatively, for example, K may be the number of physical slots. In this case, K may be the number of slots inside or outside the resource pool.

For example, if the receiving UE transmits HARQ feedback on a PSFCH resource in response to one PSSCH transmitted by the transmitting UE to the receiving UE, the receiving UE may determine a frequency domain and/or code domain of the PSFCH resource based on an implicit mechanism in a configured resource pool. For example, the receiving UE may determine the frequency domain and/or code domain of the PSFCH resource, based on at least one of a slot index related to PSCCH/PSSCH/PSFCH, a subchannel related to PSCCH/PSSCH, and/or an identifier for identifying each receiving UE in a group for HARQ feedback based on the groupcast option 2. Additionally/alternatively, for example, the receiving UE may determine the frequency domain and/or code domain of the PSFCH resource, based on at least one of SL RSRP, SINR, L1 source ID, and/or location information.

For example, if HARQ feedback transmission through the PSFCH of the UE and HARQ feedback reception through the PSFCH overlap, the UE may select any one of HARQ feedback transmission through the PSFCH and HARQ feedback reception through the PSFCH based on a priority rule. For example, the priority rule may be based on at least priority indication of the related PSCCH/PSSCH.

For example, if HARQ feedback transmission of a UE through a PSFCH for a plurality of UEs overlaps, the UE may select specific HARQ feedback transmission based on the priority rule. For example, the priority rule may be based on at least priority indication of the related PSCCH/PSSCH.

Figure 12:
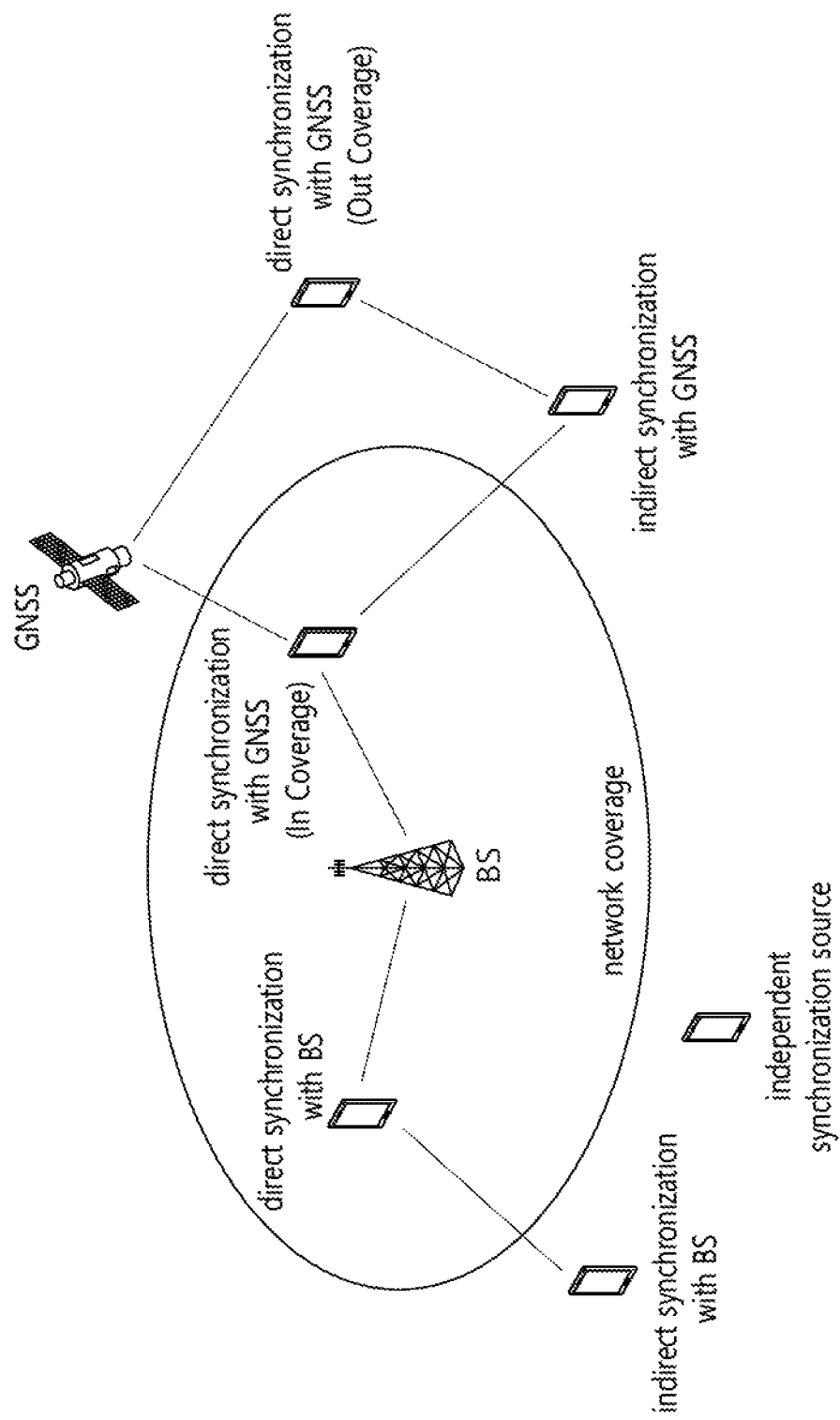
FIG. 12 shows a synchronization source or synchronization reference of V2X, in accordance with an embodiment of the present disclosure.

FIG. 12 shows a synchronization source or synchronization reference of V2X, in accordance with an embodiment of the present disclosure. The embodiment of FIG. 12 may be combined with various embodiments of the present disclosure.

Referring to FIG. 12, in V2X, a UE may be directly synchronized with a global navigation satellite system (GNSS), or may be indirectly synchronized with the GNSS through a UE (inside network coverage or outside network coverage) directly synchronized with the GNSS. If the GNSS is configured as the synchronization source, the UE may calculate a DFN and a subframe number by using a coordinated universal time (UTC) and a (pre)configured direct frame number (DFN) offset.

Alternatively, the UE may be directly synchronized with a BS, or may be synchronized with another UE which is time/frequency-synchronized with the BS. For example, the BS may be an eNB or a gNB. For example, if the UE is inside the network coverage, the UE may receive synchronization information provided by the BS, and may be directly synchronized with the BS. Thereafter, the UE may provide the synchronization information to adjacent another UE. If BS timing is configured based on synchronization, for synchronization and downlink measurement, the UE may be dependent on a cell related to a corresponding frequency (when it is inside the cell coverage at the frequency), or a primary cell or a serving cell (when it is outside the cell coverage at the frequency).

The BS (e.g., serving cell) may provide a synchronization configuration for a carrier used in V2X or SL communication. In this case, the UE may conform to the synchronization configuration received from the BS. If the UE fails to detect any cell in a carrier used in the V2X or SL communication and fails to receive the synchronization configuration from the serving cell, the UE may conform to a pre-configured synchronization configuration.

Alternatively, the UE may be synchronized with another UE which fails to obtain synchronization information directly or indirectly from the BS or the GNSS. A synchronization source or preference may be pre-configured to the UE. Alternatively, the synchronization source and preference may be configured through a control message provided by the BS.

An SL synchronization source may be associated/related with a synchronization priority. For example, a relation between the synchronization source and the synchronization priority may be defined as shown in Table 5 or Table 6. Table 5 or Table 6 are for exemplary purposes only, and the relation between the synchronization source and the synchronization priority may be defined in various forms.

TABLE 5

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | All other UEs | GNSS |
| P4 | N/A | All UEs directly synchronized with GNSS |
| P5 | N/A | All UEs indirectly synchronized with GNSS |
| P6 | N/A | All other UEs |

TABLE 6

| Priority level | GNSS-based synchronization | eNB/gNB-based synchronization |
|---|---|---|
| P0 | GNSS | BS |
| P1 | All UEs directly synchronized with GNSS | All UEs directly synchronized with BS |
| P2 | All UEs indirectly synchronized with GNSS | All UEs indirectly synchronized with BS |
| P3 | BS | GNSS |

TABLE 6-continued

| Priority level | GNSS-based synchronization | eNB/gNB-based synchronization |
| --- | --- | --- |
| P4 | All UEs directly synchronized with BS | All UEs directly synchronized with GNSS |
| P5 | All UEs indirectly synchronized with BS | All UEs indirectly synchronized with GNSS |
| P6 | Remaining UE(s) having low priority | Remaining UE(s) having low priority |

In Table 5 or Table 6, P0 may denote a highest priority, and P6 may denote a lowest priority. In Table 5 or Table 6, the BS may include at least one of a gNB and an eNB.

Whether to use GNSS-based synchronization or BS-based synchronization may be (pre)configured. In a single-carrier operation, the UE may derive transmission timing of the UE from an available synchronization reference having the highest priority.

In UE-to-UE communication (e.g., sidelink communication or V2X communication), it may be important to increase the reliability of information to be transmitted. Therefore, to increase the reliability of information to be transmitted, a method by which a UE receiving information transmits hybrid automatic repeat request (HARQ) feedback may be considered. In this case, a UE transmitting the information (hereinafter, "transmitting UE") may receive HARQ feedback transmitted by the UE attempting to receive the information (hereinafter, "receiving UE") and thus may determine whether the information transmitted by the transmitting UE is successfully transmitted. The HARQ feedback may be transmitted on a physical sidelink feedback channel (PSFCH).

According to resource design or resource management for a PSFCH, when different PSCCHs/PSSCHs are transmitted via non-overlapping resources, different PSFCHs corresponding to the different PSCCHs/PSSCHs also need to be transmitted via non-overlapping resources. However, in order to achieve this aspect, the number of reserved PSFCH resources may be increased, and flexibility in resource utilization of a network may be limited in some cases. For example, in a case where a long-duration PSFCH is used in the middle of a BWP, when a PSSCH and the long-duration PSFCH are subjected to FDM, the maximum number of allocated RBs may be limited in order ensure continuous mapping. Further, even in a case where a short-duration PSFCH is used, when a short-duration PSSCH is introduced and the short-duration PSSCH and the short-duration PSFCH are subjected to FDM, the maximum number of allocated RBs may be limited in order ensure continuous mapping. Therefore, it is necessary to propose a method for efficiently configuring a resource for a PSFCH. Hereinafter, a method for determining a PSFCH resource and an apparatus supporting the same will be described according to an embodiment of the disclosure.

Figure 13:
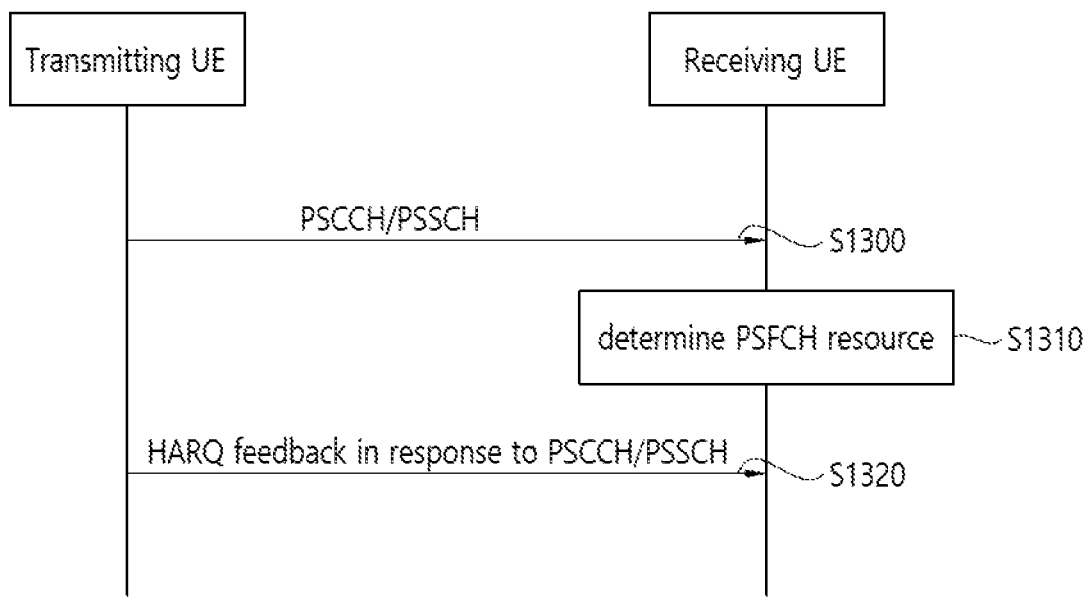
FIG. 13 illustrates a procedure in which a UE transmits HARQ feedback according to an embodiment of the disclosure.

FIG. 13 illustrates a procedure in which a UE transmits HARQ feedback according to an embodiment of the disclosure. The embodiment illustrated in FIG. 13 may be combined with various embodiments of the disclosure.

Referring to FIG. 13, in operation S1300, a receiving UE may receive a PSCCH and/or a PSSCH from a transmitting UE.

In operation S1310, the receiving UE may determine a PSFCH resource for transmitting HARQ feedback in response to the PSCCH and/or PSSCH based on information on the PSFCH resource. For example, the PSFCH resource may also be referred to as a PSFCH resource pool or a PSFCH resource set.

The information on the PSFCH resource may be (pre) configured by a base station. For example, the information on the PSFCH resource may be preconfigured when the UE is within the coverage of the base station. Alternatively, the information on the PSFCH resource may be preconfigured by the UE. The information on the PSFCH resources preconfigured by the UE may be exchanged through signaling predefined between UEs. For example, the predefined signaling may be at least one of PC5 RRC signaling, L1 signaling, or L2 signaling.

According to an embodiment of the disclosure, the information on the PSFCH resource may be a rule for (implicit) mapping between the PSCCH/PSSCH and a PSFCH. For example, the PSFCH may be transmitted at a position extended from the PSCCH/PSSCH on a time axis. The information on the PSFCH resource may include at least one of the following pieces of information.

(1) Information on Slot for Transmitting PSFCH

For example, a slot for transmitting the PSFCH may be indicated by a period and/or slot offset based on a specific time point. For example, the specific time point may be D2D frame number (DFN) 0. Information on the slot for transmitting the PSFCH may be applied to a sidelink slot when deriving the PSFCH slot.

Figure 14:
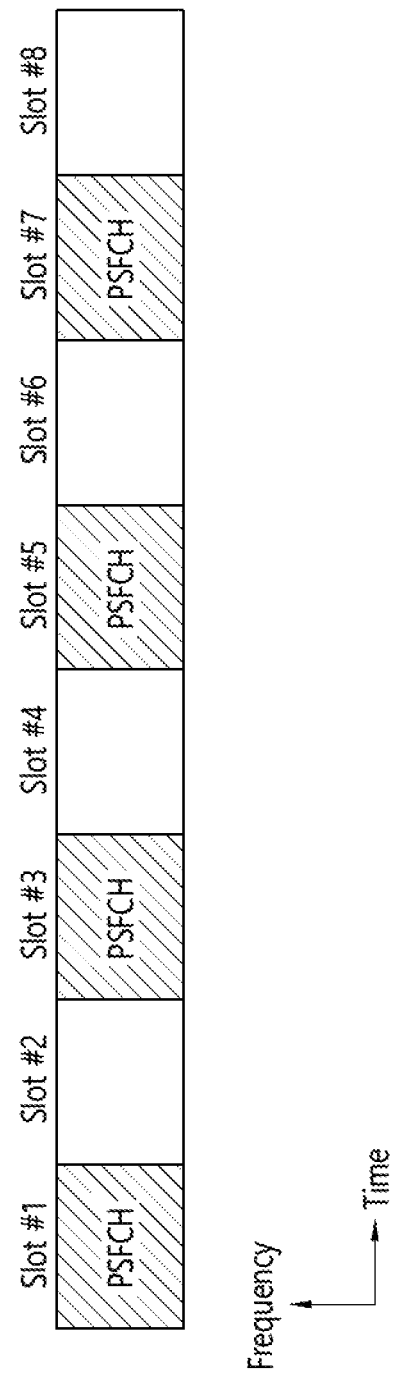
FIG. 14 illustrates a case where information on a PSFCH resource includes information on a slot for transmitting a PSFCH according to an embodiment of the disclosure.

FIG. 14 illustrates a case where the information on the PSFCH resource includes the information on the slot for transmitting the PSFCH according to an embodiment of the disclosure. The embodiment illustrated in FIG. 14 may be combined with various embodiments of the disclosure.

For example, when the information on the PSFCH resource includes information on an odd slot, the UE may determine that the PSFCH can be transmitted in the odd slot as illustrated in FIG. 14.

Figure 15:
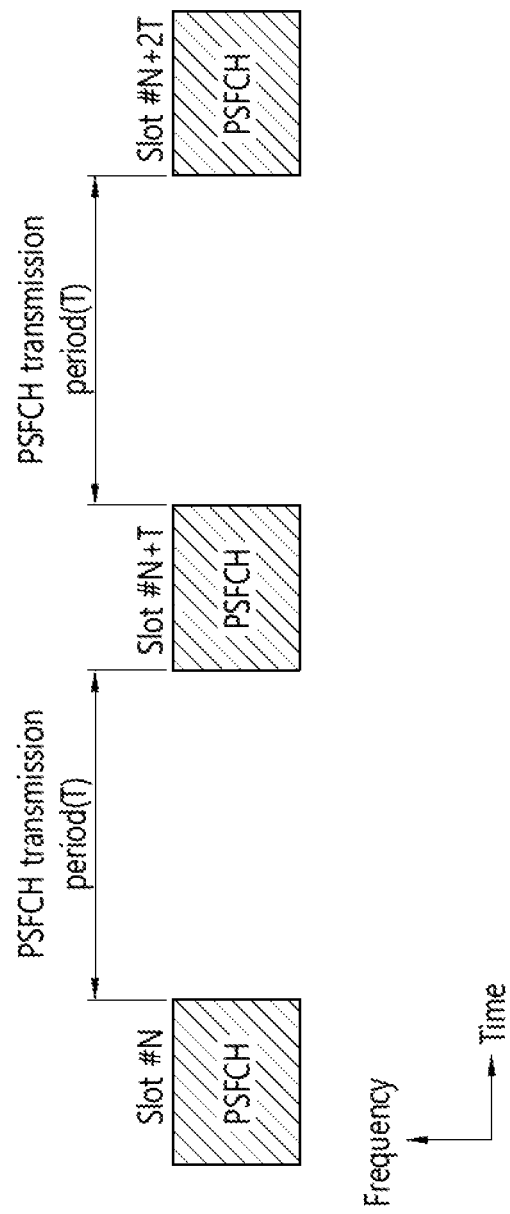
FIG. 15 illustrates a case where information on a PSFCH resource includes information on a specific slot and a PSFCH transmission period according to an embodiment of the disclosure.

FIG. 15 illustrates a case where the information on the PSFCH resource includes information on a specific slot and a PSFCH transmission period according to an embodiment of the disclosure. The embodiment illustrated in FIG. 15 may be combined with various embodiments of the disclosure.

For example, when the information on the PSFCH resource includes information on a specific slot and a PSFCH transmission period, the UE may determine that the PSFCH can be transmitted in slots repeated every the PSFCH transmission period with respect to the specific slot as illustrated in FIG. 15.

Figure 16:
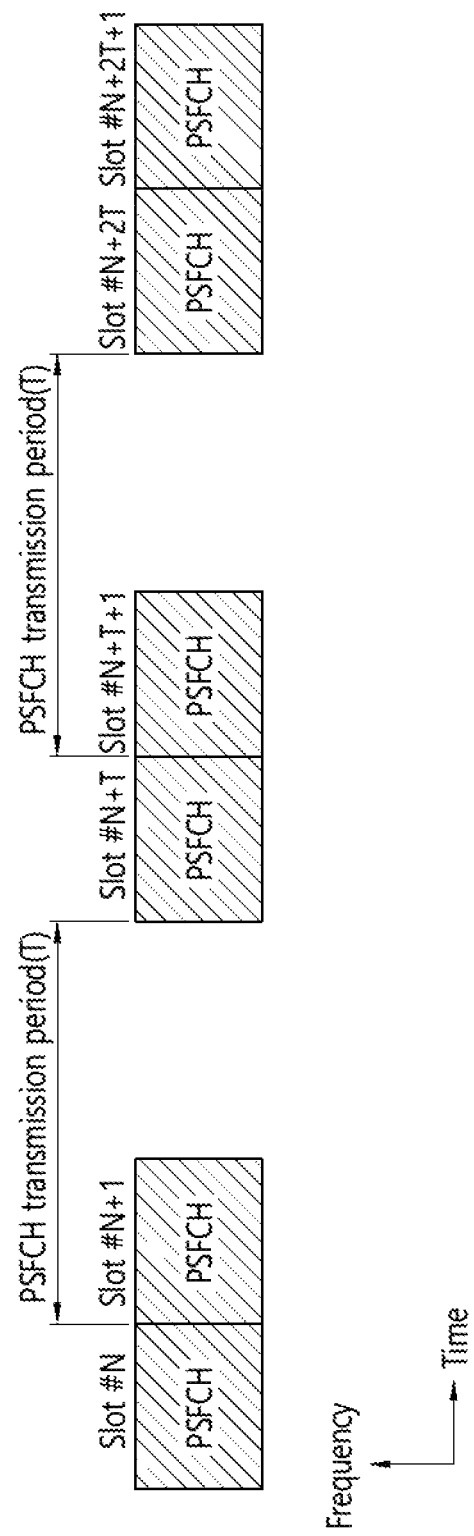
FIG. 16 illustrates a case where information on a PSFCH resource includes information on a specific slot, a PSFCH transmission period, and a slot group according to an embodiment of the disclosure.

FIG. 16 illustrates a case where the information on the PSFCH resource includes information on a specific slot, a PSFCH transmission period, and a slot group according to an embodiment of the disclosure. The embodiment illustrated in FIG. 16 may be combined with various embodiments of the disclosure.

For example, when the information on the PSFCH resource includes information on a specific slot, a PSFCH transmission period, and a slot group, the UE may determine that the PSFCH can be transmitted in slot groups repeated every the PSFCH transmission period with respect to the specific slot as illustrated in FIG. 16. The slot groups may be indicated using the number of slots and/or a bitmap.

(2) Information on PSFCH Format to be Used by UE

According to an embodiment of the disclosure, there may be a plurality of PSFCH formats. In this case, the information on the PSFCH resource may include information on the PSFCH formats. For example, when PSFCH format 1 and PSFCH format 2 are defined, a PSFCH format to be used may be defined in advance.

Furthermore, the information on the PSFCH resource may include information on symbol duration and/or a starting symbol of a slot. When symbols occupied by the PSFCH in a slot are not aligned between a plurality of UEs, each UE may need to perform automatic gain control (AGC) for each symbol. In this case, it may be meaningless for the receiving UE to transmit the PSFCH. Therefore, the symbol duration and/or the starting symbol of the slot may be designated as a single value in a resource pool. Alternatively, the symbol duration and/or the starting symbol of the slot may be designated as a single value per PSFCH format in a resource pool. Therefore, according to the embodiment of the disclosure, at least a starting symbol index may be fixed in view of AGC.

(3) Information on code-domain multiplexing capacity supported by RB or RS group For example, this information may be the number of cyclic shifts or a combination of cyclic shifts to be used.

[Table 7]

A UE determines a number of PSFCH resources available for multiplexing HARQ-ACK information in a PSFCH transmission as $R^{PRB,CS}_{PSFCH} = N^{PSFCH}_{type} \cdot M^{PSFCH}_{subch,slot} \cdot N^{PSFCH}_{CS}$ where $N^{PSFCH}_{CS}$ is a number of cyclic shift pairs for the resource pool and, based on an indication by higher layers, $N^{PSFCH}_{type} = N^{PSFCH}_{subch}$ and then $N^{PSFCH}_{subch} \cdot M^{PSFCH}_{subch,slot}$ are located in one or more subchannels from the $N^{PSSCH}_{subch}$ subchannels Referring to Table 7, the UE may determine the number of PSFCH resources based on the number of cyclic shift pairs for a resource pool. For example, the UE may receive the number of cyclic shift pairs for the resource pool from the base station.

Code-domain multiplexing (CDM) may be supported according to a PSFCH design. CDM may be achieved by changing a cyclic shift or by changing an orthogonal cover code (OCC). According to an embodiment of the present disclosure, even though multiplexing capacity is 12 based on 12 cyclic shifts, multiplexing capacity for a specific RB or a specific RS group may be set to lower than 12 in view of a near-far problem according to the PSFCH design. For example, multiplexing capacity for a specific RB or a specific RS group may be set to 1, in which case CDM may not be supported for the specific RB or the specific RS group.

For example, in a future system, when the number of cyclic shifts supported for each RB is (pre)configured for a UE, it is necessary to define the value of a cyclic shift to be actually used by the UE for CDM. For example, when the UE transmits a PSFCH, an HARQ-ACK state transmitted through the PSFCH may be expressed as a cyclic shift. Thus, the cyclic shift to be used for the CDM may be, for example, a form added to the value of the cyclic shift expressing the HARQ-ACK state. Alternatively, the cyclic shift to be used for the CDM may be, for example, a combination of cyclic shift pairs expressing the HARQ-ACK state. For example, it is assumed that a cyclic shift pair used to distinguish the HARQ-ACK state is set to 0 and 6 for the UE.

For example, when the number of cyclic shifts or pairs for each RB is set to 1 for the UE, a cyclic shift pair used by the UE to transmit the PSFCH may be {0, 6}.

For example, when the number of cyclic shifts or pairs for each RB is set to 2 for the UE, cyclic shift pairs used by the UE to transmit the PSFCH may be {0, 6} and {3, 9}.

For example, when the number of cyclic shifts or pairs for each RB is set to 3 for the UE, cyclic shift pairs used by the UE to transmit the PSFCH may be {0, 6}, {2, 8}, and {4, 10}. Can be.

For example, when the number of cyclic shifts or pairs for each RB is set to 4 for the UE, cyclic shift pairs used by the UE to transmit the PSFCH may be {0, 6}, {3, 9}, {1, 7}, and {4, 10}. Alternatively, for example, when the number of cyclic shifts or pairs for each RB is set to 2 for the UE, cyclic shift pairs used by the UE to transmit the PSFCH may be {0, 6}, {1, 7}, {2, 8}, and {3, 9}.

For example, when the number of cyclic shifts or pairs for each RB is set to 4 for the UE, cyclic shift pairs used by the UE to transmit the PSFCH may be {0, 6}, {2, 8}, {4, 10}, and {1, 7} considering that the number of cyclic shift pairs is extended from 3. Alternatively, for example, when the number of cyclic shifts or pairs for each RB is set to 4 for the UE, cyclic shift pairs used by the UE to transmit the PSFCH may be {0, 6}, {2, 8}, {4, 10}, and {3, 9} considering that the number of cyclic shift pairs is extended from 3. Alternatively, for example, when the number of cyclic shifts or pairs for each RB is set to 4 for the UE, cyclic shift pairs used by the UE to transmit the PSFCH may be {0, 6}, {2, 8}, {4, 10}, and {5, 11} considering that the number of cyclic shift pairs is extended from 3.

For example, when the number of cyclic shifts or pairs for each RB is set to 6 for the UE, cyclic shift pairs used by the UE to transmit the PSFCH may be {0, 6}, {1, 7}, {2, 8}, {3, 9}, {4, 10}, and {5, 11}. Specifically, the order of the cyclic shift pairs may be changed in order to maximize the interval between cyclic shift values used to select a PSFCH resource. For example, cyclic shift pairs used by the UE to transmit the PSFCH may be configured for the UE in an order of {0, 6}, {3, 9}, {1, 7}, {4, 10}, {2, 8}, and {5, 11}. For example, cyclic shift pairs used by the UE to transmit the PSFCH may be configured for the UE in an order of {0, 6}, {3, 9}, {2, 8}, {5, 11}, {1, 7}, and {4, 10}.

The foregoing configurations of cyclic shift pairs are merely examples. For example, a cyclic shift pair may be expressed as an offset value added to a cyclic shift value pair for expressing the HARQ-ACK state. For example, all or some of values of 0, 1, 2, 3, 4, and 5 may be used as an offset.

Depending on the cast type, 1) the UE may use cyclic shifts for an ACK and a NACK, and 2) the UE may use only a cyclic shift for a NACK. It may be considered to change the order of cyclic shift pairs for the PSFCH in order to average the frequency of adjacent cyclic shift values. For example, cyclic shift values indicating an ACK in adjacent PSFCH cyclic shift pairs may be different from each other. For example, in a first PSFCH cyclic shift pair, a first cyclic shift in the pair may indicate a NACK. For example, in a second PSFCH cyclic shift pair, a second cyclic shift in the pair may indicate a NACK.

(4) Information on RB or RB Group to be Used by UE

This information may be, for example, a starting RB index and a length. This information may be, for example, a starting RB index and the number of RBs. Alternatively, for example, an RB or an RB group to be used by the UE may be configured at both ends of a sidelink BWP. For example, the RB or the RB group to be used by the UE may be automatically inferred based on the mapping between the PSSCH and the PSFCH. For example, information on the RB group to be used by the UE may be a set of RBs available for the UE to (actually) transmit the PSFCH in a resource pool.

[Table 8]
A UE is provided, by rbSetPSFCH, a set of $M_{PRB,set}^{PSFCH}$ PRBs in a resource pool for PSFCH transmission in a PRB of the resource pool. For a number of $N_{subch}$ subchannels for the resource pool, provided by numSubchannel, and a number of $N_{PSSCH}^{PSFCH}$ PSSCH slots associated with a PSFCH slot, provided by periodPSFCHresource, the UE allocates the $[(i+j \cdot N_{PSSCH}^{PSFCH}) \cdot M_{subch,\ slot}^{PSFCH},$ $(i+1+j \cdot N_{PSSCH}^{PSFCH}) \cdot M_{subch,\ slot}^{PSFCH} -1]$ PRBs from the $M_{PRB,set}^{PSFCH}$ PRBs to slot i and sub-channel j, where $M_{subch,\ slot}^{PSFCH} = M_{PRB,\ set}^{PSFCH}/(N_{subch} \cdot N_{PSSCH}^{PSFCH})$, $0 \le i < N_{PSSCH}^{PSFCH}$, $0 \le j < N_{subch}$, and the allocation starts in an ascending order of i and continues in an ascending order of j.

Referring to Table 8, the UE may receive information (e.g., rbSetPSFCH) on a set of PRBs in the resource pool for PSFCH transmission from the base station. The UE may allocate a resource related to PSFCH transmission in the resource pool based on the information related to the set of PRBs. The UE may transmit the PSFCH using the allocated resource.

Alternatively, the information may be a bitmap. For example, the information related to the RB or the RB group to be used by the UE for PSFCH transmission may be in a bitmap form. For example, the UE may receive a bitmap and may determine/select an RB or an RB group to be used by the UE for PSFCH transmission based on the bitmap. For example, the bitmap may be configured per resource pool for the UE or may be configured in advance.

For example, each bit of the bitmap may indicate each RB in the resource pool. For example, each bit of the bitmap may be related to each RB in the resource pool. For example, the UE receiving the bitmap may determine/select an RB available for PSFCH transmission in the resource pool based on each bit of the bitmap. For example, when the bit of the bitmap is 1, the UE may use an RB corresponding to bit 1 for PSFCH transmission. For example, when the bit of the bitmap is 0, the UE may not use an RB corresponding to bit 0 for PSFCH transmission. For example, the UE may exclude the RB corresponding to bit 0 from RBs available for PSFCH transmission.

For example, each bit of the bitmap may indicate each RB in a subchannel. For example, each bit of the bitmap may be related to each RB in the subchannel. For example, the UE receiving the bitmap may determine/select an RB available for PSFCH transmission in the subchannel based on each bit of the bitmap. In this case, for example, the bitmap may be applied in common to all subchannels in the resource pool.

For example, each bit of a first bitmap may indicate each RB in a specific subchannel. For example, each bit of the first bitmap may be related to each RB in the specific subchannel. For example, the UE receiving the first bitmap may determine/select an RB available for PSFCH transmission in the specific subchannel based on each bit of the first bitmap. For example, the first bitmap may be applied only to the specific subchannel in the resource pool. Here, for example, a second bitmap that is configured or preconfigured per each resource pool for the UE may indicate the specific subchannel. For example, each bit of the second bitmap may be related to each subchannel in the resource pool. For example, the UE may receive the first bitmap and the second bitmap, may determine/select the specific subchannel based on the second bitmap, and may determine/select an RB available for PSFCH transmission in the specific subchannel based on the first bitmap.

For example, the specific subchannel may be indicated by a combination of at least one of a starting subchannel index, the number of subchannels, and/or an ending subchannel index. For example, the UE may determine/select the specific subchannel based on a combination of at least one of the starting subchannel index, the number of subchannels, and/or the ending subchannel index and may determine/select an RB available for PSFCH transmission in the specific subchannel based on the bitmap (e.g., the first bitmap).

For example, each bit of the bitmap may indicate each subchannel in the resource pool. For example, each bit of the bitmap may be related to each subchannel in the resource pool. For example, the UE may select/determine one or more subchannels based on the bitmap and may use all RBs included in the one or more subchannels for PSFCH transmission. For example, all RBs in one or more subchannels indicated by the bitmap may be used for PSFCH transmission.

(5) Information on Timing Gap Between PSCCH/PSSCH and Related PSFCH

For example, when a PSFCH is required to be transmitted in a single slot for PSSCHs in a plurality of slots, a representative value of timing gaps may be a minimum value. For example, as a PSFCH slot related to a PSSCH slot, a slot having the minimum difference between the slots being equal to or greater than a timing gap may be selected. Hereinafter, in this specification, a slot set related to the same PSFCH slot may be referred to as an HARQ related set.

Figure 17:
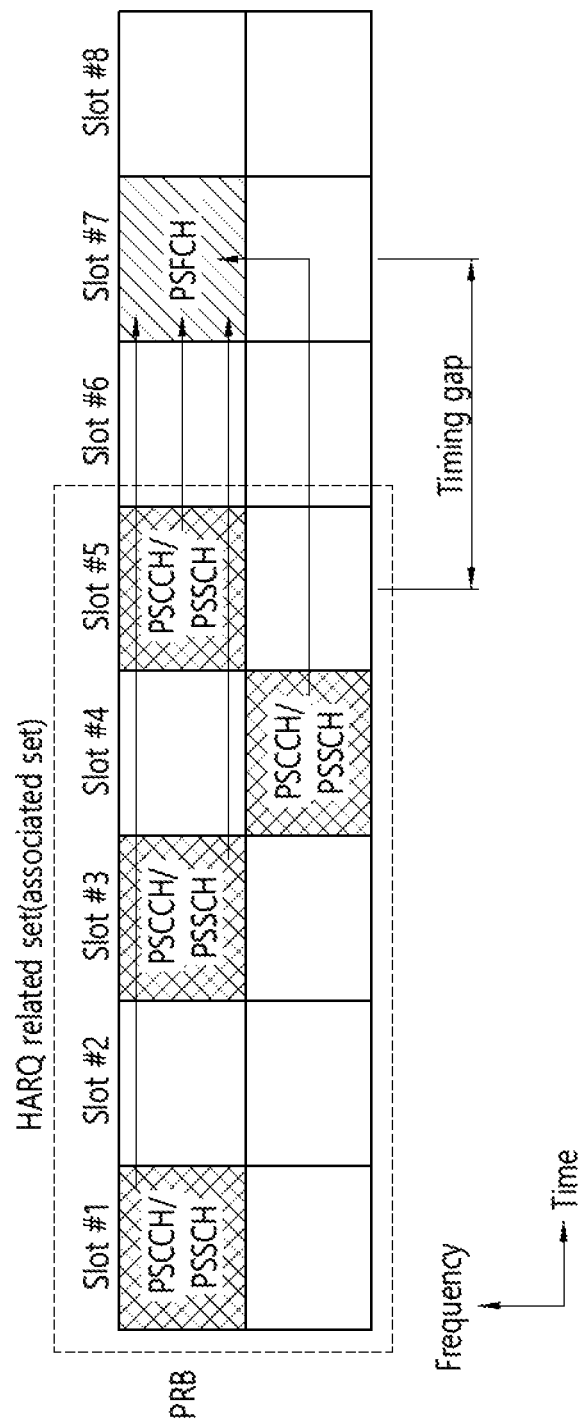
FIG. 17 illustrates a timing gap between an HARQ related set and a PSFCH slot according to an embodiment of the disclosure.

FIG. 17 illustrates a timing gap between an HARQ related set and a PSFCH slot according to an embodiment of the disclosure. The embodiment illustrated in FIG. 17 may be combined with various embodiments of the disclosure.

For example, in the embodiment of FIG. 17, a timing gap for a PSCCH/PSSCH transmitted in slot #1 may be six slots, a timing gap for a PSCCH/PSSCH transmitted in slot #3 may be four slots, a timing gap for a PSCCH/PSSCH transmitted in slot #4 may be three slots, and a timing gap for a PSCCH/PSSCH transmitted in slot #5 may be two slots. In this case, a minimum value of two slots may be selected as a representative timing gap value. Furthermore, when a PSFCH is transmitted in one slot for a plurality of PSCCHs/PSSCHs, a slot set (i.e., slot #1 to slot #5) related to a PSFCH slot (i.e., slot #7) may be referred to as an HARQ related set. In addition, slots #6 to #8 may be included in another HARQ related set.

(6) Information on Mapping Relationship Between PSCCH/PSSCH and PSFCH Resources

For example, this information may be information on a mapping relationship between the index of a slot/index of a first subchannel in an HARQ related set for the PSCCH/PSSCH and a PSFCH resource. In this case, mapping may be performed by the following method.

For example, stacking may be performed from the PSFCH resource for the first subchannel of each slot in the HARQ related set (in the resource pool for the PSSCH). The stacking may refer to a mapping type in which mapping starts from a code-domain resource at the end of the sidelink BWP and is sequentially performed on subsequent RBs.

For example, considering allocation of a plurality of subchannels, interleaved mapping between a subchannel and the PSFCH resource may be assumed. Specifically, considering mapping in one slot, an interval of N subchannels may be allowed between adjacent PSFCH resources and a first subchannel for mapping corresponding PSSCHs. For example, PSFCH resources for subchannels with even-numbered indexes may be stacked, and then PSFCH resources for subchannels with odd-numbered indexes may be stacked. For example, when UE 1 uses subchannels {0, 1} and UE 2 uses subchannels {2, 3}, PSFCH resources are 0 and 2 according to non-interleaved mapping, while PSFCH resources may be reset to 0 and 1 according to interleaved mapping. For example, when extending to a time domain, the UE may perform stacking in N subchannel steps in performing stacking on each subchannel of the HARQ related set.

Alternatively, according to an embodiment of the disclosure, the information on the PSFCH resource may be indicated by SCI. For example, the SCI may indicate some resources (e.g., frequencies and/or coded) for the PSFCH. When the PSFCH is indicated by the SCI, even though different UEs transmit a PSCCH/PSSCH using non-overlapping resources, PSFCH resources may overlap. Accordingly, in an embodiment of the disclosure, to solve this problem, a UE may configure a frequency resource for the PSFCH based on the rule for mapping between the PSCCH/PSSCH and the PSFCH and may configure a code domain based on the SCI.

Referring back to FIG. 13, in operation S1320, the receiving UE may transmit HARQ feedback in response to the PSCCH/PSSCH to the transmitting UE based on the determined PSFCH resource.

According to the embodiment of the disclosure, the UE may efficiently determine a resource for a PSFCH based on the mapping rule and/or SCI.

For one UE, when PSFCH transmissions collide in the same slot, a method for solving the collision may be required. For example, when a plurality of PSCCHs/PSSCHs for one receiving UE is transmitted in one HARQ related set, the receiving UE may need to transmit a plurality of PSFCHs for the plurality of PSCCHs/PSSCHs in the same slot. In this case, the plurality of PSFCH may collide in transmission via the same slot, and thus a method for solving this collision need to be proposed. Hereinafter, a method for solving a collision in PSFCH transmission and an apparatus supporting the same will be described according to an embodiment of the disclosure.

According to an embodiment of the disclosure, a priority rule for selecting one PSFCH may be set. Hereinafter, although a first method and a second method are separately illustrated for convenience of description, these methods are not construed as being mutually exclusive but may be combined with each other.

(1) First Method for Selecting PSFCH Resource

Upon receiving a plurality of PSCCHs/PSSCHs, a receiving UE may select a PSFCH resource related to the last PSCCH/PSSCH received by the receiving UE in an HARQ related set. For example, the last PSCCH/PSSCH may be a PSCCH/PSSCH dedicated to the receiving UE. In the first method, when a different UE performing a sensing operation succeeds in decoding SCI, the different UE may avoid the PSFCH resource.

(2) Second Method for Selecting PSFCH Resource

Upon receiving a plurality of PSCCHs/PSSCHs, a receiving UE may select one PSFCH resource from among a plurality of colliding PSFCH resources. For example, the receiving UE may perform a sensing operation and may select a suitable PSFCH resource accordingly. For example, the receiving UE may select a PSFCH resource to minimize resource fragmentation in view of network resource utilization efficiency. In the second method, a different UE performing a sensing operation may avoid the plurality of PSFCH resources related to the plurality of PSCCHs/PSSCHs regardless of decoding of SCI.

According to the proposed method, some PSFCHs may be dropped. In this case, it is necessary to properly process sidelink feedback control information (SFCI) related to the dropped PSFCHs. According to an embodiment of the disclosure, the SFCI related to the dropped PSFCHs may also be dropped. Alternatively, according to an embodiment of the disclosure, the SFCI related to the dropped PSFCHs may be piggybacked on the PSFCH resource elected by the receiving UE. In this case, a different payload may be supported according to the format, and format adaptation may be additionally required. Alternatively, according to an embodiment of the disclosure, in HARQ feedback, bundling and/or multiplexing may be performed. In this case, a mechanism for distinguishing a PSSCH missing case and a PSCCH DTX may be additionally required. For example, to distinguish a PSCCH missing case and a PSCCH DTX, a sidelink assignment index (SAI) needs to be introduced. For example, when a single UE transmits a plurality of PSCCHs/PSSCHs in a slot in an HARQ related set, an SAI field value in SCI transmitted via the PSCCHs may increase in chronological order. Therefore, in the above case, a receiving UE may determine a missing case for a PSCCH corresponding to SAI which is expected to be transmitted but is not received based on the an SAI value in successfully decoded SCI.

Additionally, according to an embodiment of the disclosure, an HARQ-ACK codebook may be configured. Hereinafter, although a first method and a second method are separately illustrated for convenience of description, these methods are not construed as being mutually exclusive but may be combined with each other.

(1) First Method for Configuring HARQ-ACK Codebook

In view of an HARQ related set, an HARQ-ACK codebook including a plurality of bits may be configured (on a worst case basis). In this case, however, when a PSCCH/PSSCH is transmitted only in some slots within the HARQ related set, PSFCH detection performance may be unnecessarily reduced.

(2) Second Method for Configuring HARQ-ACK Codebook

An HARQ-ACK codebook may be configured based on actual scheduling. For example, an HARQ-ACK codebook for one PSCCH/PSSCH may be configured based on scheduling. For example, an HARQ-ACK codebook for a plurality of PSCCHs/PSSCHs may be configured based on scheduling.

For example, when SAI is introduced and a PSCCH/PSSCH receiving UE receives only a PSCCH/PSSCH for SAI=1, the receiving UE may expect/assume an HARQ-ACK codebook for one PSCCH/PSSCH. In addition, the receiving UE may expect/assume an HARQ-ACK codebook for a PSSCH/PSSCH that can be transmitted via each slot of an HARQ related set.

For example, when SAI is introduced and a PSCCH/PSSCH receiving UE receives a PSCCH/PSSCH for SAI=N, the receiving UE may expect/assume an HARQ-ACK codebook for N PSCCHs/PSSCHs in an HARQ related set according to N.

According to an embodiment of the disclosure, an HARQ related set may be configured, and a receiving UE may efficiently transmit HARQ feedback in response to a PSCCH/PSSCH transmitted in the HARQ related set on a PSFCH resource.

Figure 18:
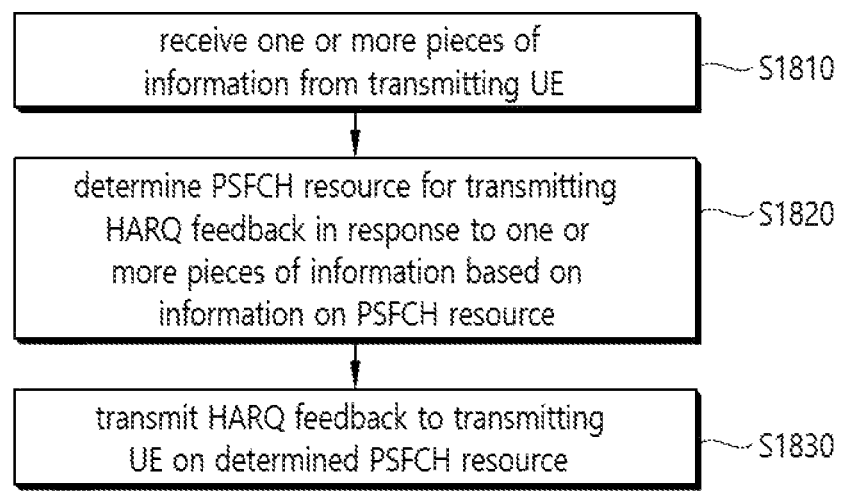
FIG. 18 illustrates a method in which a reception UE transmits HARQ feedback according to an embodiment of the disclosure.

FIG. 18 illustrates a method in which a receiving UE transmits HARQ feedback according to an embodiment of the disclosure. The embodiment illustrated in FIG. 18 may be combined with various embodiments of the disclosure.

Referring to FIG. 18, in operation S1810, the receiving UE may receive one or more pieces of information from a transmitting UE. The one or more pieces of information may be received on a PSCCH and/or PSSCH. In operation S1820, the receiving UE may determine a PSFCH resource for transmitting HARQ feedback in response to the one or more pieces of information based on information on a PSFCH resource. The information on the PSFCH resource may include at least one of information on a slot for transmitting a PSFCH, information on a PSFCH format, information on an RB or an RB group, code-domain multiplexing capacity for an RB or an RB group, information on a timing gap between a PSCCH/PSSCH and a related PSFCH, or information on a relationship between PSCCH/PSSCH and PSFCH resources. In operation S1830, the receiving UE may transmit the HARQ feedback to the transmitting UE on the determined PSFCH resource. In addition, the receiving UE may perform synchronization with a synchronization source and may perform the foregoing operation based on the synchronization. Further, the receiving UE may configure one or more BWPs and may perform the foregoing operation on the one or more BWPs.

The proposed method may be applied to an apparatus described below. First, a processor 102 of a receiving UE 100 may control a transceiver 106 of the receiving UE 100 to receive one or more pieces of information from a transmitting UE 200. The one or more pieces of information may be received on a PSCCH and/or PSSCH. The processor 102 of the receiving UE 100 may determine a PSFCH resource for transmitting HARQ feedback in response to the one or more pieces of information based on information on a PSFCH resource. The information on the PSFCH resource may include at least one of information on a slot for transmitting a PSFCH, information on a PSFCH format, information on an RB or an RB group, code-domain multiplexing capacity for an RB or an RB group, information on a timing gap between a PSCCH/PSSCH and a related PSFCH, or information on a relationship between PSCCH/PSSCH and PSFCH resources. The processor 102 of the receiving UE 100 may control the transceiver 106 of the receiving UE 100 to transmit the HARQ feedback to the transmitting UE 200 on the determined PSFCH resource.

Figure 19:
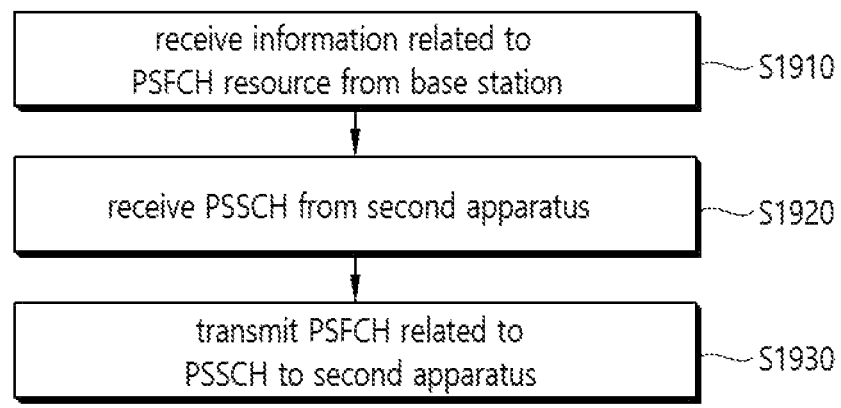
FIG. 19 illustrates a method in which a first apparatus performs wireless communication according to an embodiment of the disclosure.

FIG. 19 illustrates a method in which a first apparatus performs wireless communication according to an embodiment of the disclosure. The embodiment illustrated in FIG. 19 may be combined with various embodiments of the disclosure.

Referring to FIG. 19, in operation S1910, the first apparatus may receive information related to a physical sidelink feedback channel (PSFCH) resource from a base station.

For example, the information related to the PSFCH resource may include information related to a resource block (RB) available for the first apparatus to transmit a PSFCH. For example, the information related to the RB available to transmit the PSFCH may be information related to an RB set available to transmit the PSFCH in a resource pool configured for the first apparatus. For example, the information related to the RB available to transmit the PSFCH may be a bitmap. For example, each bit of the bitmap may indicate each RB in the resource pool. For example, an RB related to 1 of the bitmap may be an RB available for transmission of the PSFCH, and an RB related to 0 of the bitmap may be an RB unavailable for transmission of the PSFCH.

For example, the information related to the PSFCH resource may include information related to code-domain multiplexing capacity used by the first apparatus to transmit the PSFCH on the RB. For example, the information related to the code-domain multiplexing capacity may include the number of cyclic shift pairs. For example, the PSFCH may be transmitted to the second apparatus on the RB based on the number of the cyclic shift pairs.

For example, the information related to the PSFCH resource may include information related to a slot available for the first apparatus to transmit the PSFCH.

For example, the information related to the PSFCH resource may include information related to a PSFCH format available for the first apparatus to transmit the PSFCH.

In operation S1920, the first apparatus may receive a physical sidelink shared channel (PSSCH) from the second apparatus. In operation S1930, the first apparatus may transmit a PSFCH related to the PSSCH to the second apparatus. For example, the PSFCH may be transmitted to the second apparatus on the RB.

For example, the PSSCH may be a plurality of PSSCHs. In this case, for example, a resource used by the first apparatus to transmit the PSFCH may be a PSFCH resource related to the last received PSSCH among the plurality of PSSCHs received by the first apparatus.

The proposed method may be applied to an apparatus described below. First, a processor 102 of a first apparatus 100 may control a transceiver 106 to receive information related to a physical sidelink feedback channel (PSFCH) resource from a base station. Further, the processor 102 of the first apparatus 100 may control the transceiver 106 to receive a physical sidelink shared channel (PSSCH) from a second apparatus 200. In addition, the processor 102 of the first apparatus 100 may control the transceiver 106 to transmit a PSFCH related to the PSSCH to the second apparatus 200.

According to an embodiment of the disclosure, there is provided a first apparatus for performing wireless communication. For example, the first apparatus may include: at least one memory to store instructions; at least one transceiver; and at least one processor to connect the at least one memory and the at least one transceiver. For example, the at least one processor may execute the instructions to: receive information related to a physical sidelink feedback channel (PSFCH) resource from a base station; receive a physical sidelink shared channel (PSSCH) from a second apparatus; and transmit a PSFCH related to the PSSCH to the second apparatus. Here, the information related to the PSFCH resource may include information related to a resource block (RB) available for the first apparatus to transmit the PSFCH.

According to an embodiment of the disclosure, there is provided an apparatus configured to control a first UE. For example, the apparatus may include: at least one processor; and at least one memory to be operatively connected to the at least one processor and to store instructions. For example, the at least one processor may execute the instructions to: receive information related to a physical sidelink feedback channel (PSFCH) resource from a base station; receive a physical sidelink shared channel (PSSCH) from a second UE; and transmit a PSFCH related to the PSSCH to the second UE. Here, the information related to the PSFCH resource may include information related to a resource block (RB) available for the first UE to transmit the PSFCH.

According to an embodiment of the disclosure, there is provided a non-transitory computer-readable storage medium that records instructions. For example, when executed by at least one processor, the instructions cause the at least one processor to: receive, by a first apparatus, information related to a physical sidelink feedback channel (PSFCH) resource from a base station; receive, by the first apparatus, a physical sidelink shared channel (PSSCH) from a second apparatus; and transmit, by the first apparatus, a PSFCH related to the PSSCH to the second apparatus. Here, the information related to the PSFCH resource may include information related to a resource block (RB) available for the first apparatus to transmit the PSFCH.

Figure 20:
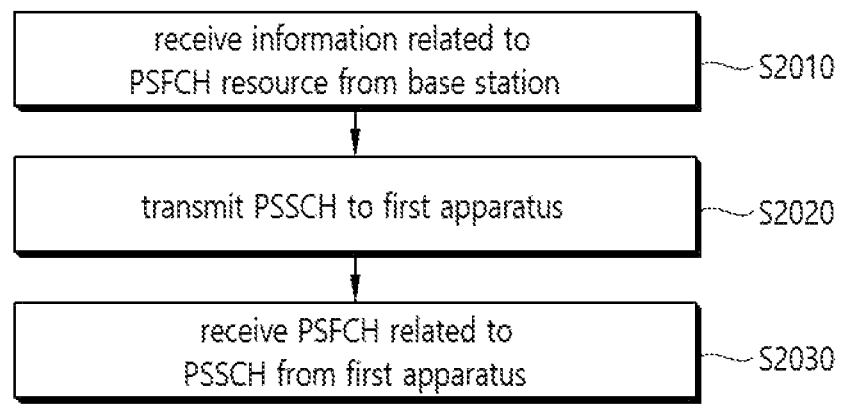
FIG. 20 illustrates a method in which a second apparatus performs wireless communication according to an embodiment of the disclosure.

FIG. 20 illustrates a method in which a second apparatus performs wireless communication according to an embodiment of the disclosure. The embodiment illustrated in FIG. 20 may be combined with various embodiments of the disclosure.

Referring to FIG. 20, in operation S2010, the second apparatus may receive information related to a physical sidelink feedback channel (PSFCH) resource from a base station.

For example, the information related to the PSFCH resource may include information related to a resource block (RB) available for the first apparatus to transmit a PSFCH. For example, the information related to the RB available to transmit the PSFCH may be information related to an RB set available to transmit the PSFCH in a resource pool configured for the first apparatus.

For example, the information related to the PSFCH resource may include information related to the number of cyclic shift pairs used by the first apparatus to transmit the PSFCH on the RB.

In operation S2020, the second apparatus may transmit a physical sidelink shared channel (PSSCH) to the first apparatus. In operation S2030, the second apparatus may receive a PSFCH related to the PSSCH from the first apparatus.

The proposed method may be applied to an apparatus described below. First, a processor 202 of a second apparatus 200 may control a transceiver 206 to receive information related to a physical sidelink feedback channel (PSFCH) resource from a base station. Further, the processor 202 of the second apparatus 200 may control the transceiver 206 to transmit a physical sidelink shared channel (PSSCH) to a first apparatus 100. In addition, the processor 202 of the second apparatus 200 may control the transceiver 206 to receive a PSFCH related to the PSSCH from the first apparatus 100.

According to an embodiment of the disclosure, there is provided a second apparatus for performing wireless communication. For example, the second apparatus may include: at least one memory to store instructions; at least one transceiver; and at least one processor to connect the at least one memory and the at least one transceiver. For example, the at least one processor may execute the instructions to: receive information related to a physical sidelink feedback channel (PSFCH) resource from a base station; transmit a physical sidelink shared channel (PSSCH) to a first apparatus; and receive a PSFCH related to the PSSCH from the first apparatus. Here, the information related to the PSFCH resource may include information related to a resource block (RB) available for the first apparatus to transmit the PSFCH.

Hereinafter, an apparatus to which various embodiments of the present disclosure can be applied will be described.

The various descriptions, functions, procedures, proposals, methods, and/or operational flowcharts of the present disclosure described in this document may be applied to, without being limited to, a variety of fields requiring wireless communication/connection (e.g., 5G) between devices.

Hereinafter, a description will be given in more detail with reference to the drawings. In the following drawings/description, the same reference symbols may denote the same or corresponding hardware blocks, software blocks, or functional blocks unless described otherwise.

Figure 21:
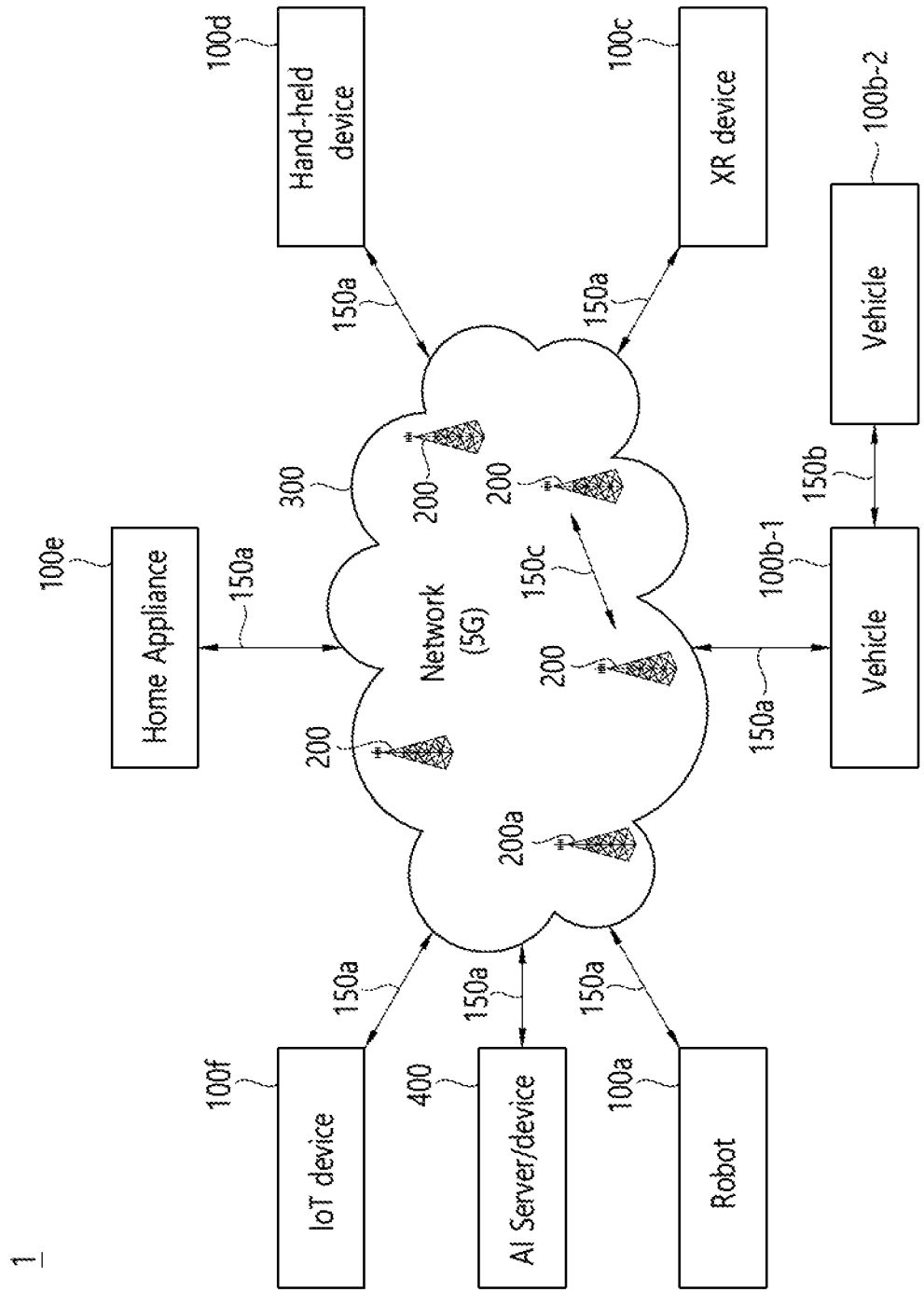
FIG. 21 shows a communication system 1, in accordance with an embodiment of the present disclosure.

FIG. 21 shows a communication system 1, in accordance with an embodiment of the present disclosure.

Referring to FIG. 21, a communication system 1 to which various embodiments of the present disclosure are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/ network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 22:
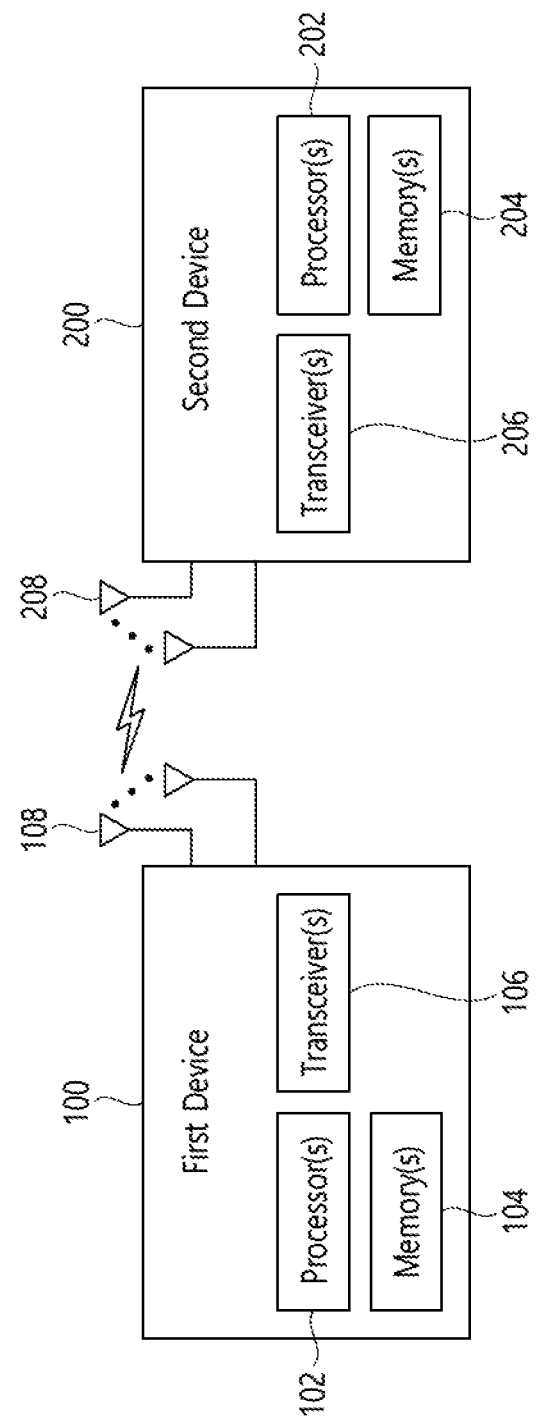
FIG. 22 shows wireless devices, in accordance with an embodiment of the present disclosure.

FIG. 22 shows wireless devices, in accordance with an embodiment of the present disclosure.

Referring to FIG. 22, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 21.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands.

The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 23:
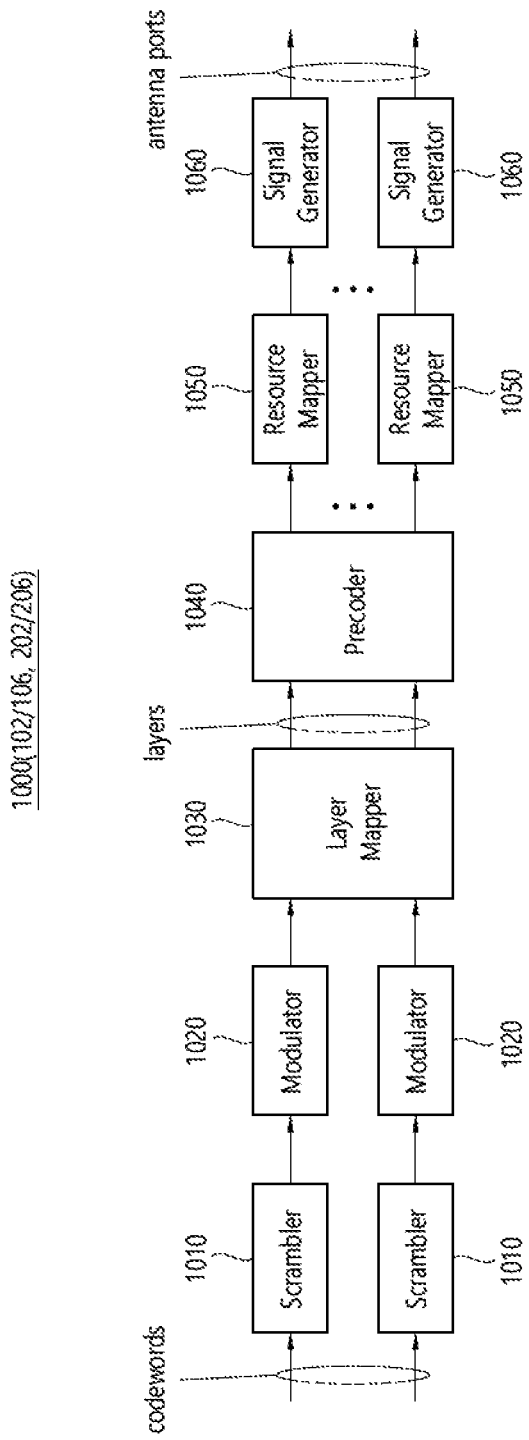
FIG. 23 shows a signal process circuit for a transmission signal, in accordance with an embodiment of the present disclosure.

FIG. 23 shows a signal process circuit for a transmission signal, in accordance with an embodiment of the present disclosure.

Referring to FIG. 23, a signal processing circuit 1000 may include scramblers 1010, modulators 1020, a layer mapper 1030, a precoder 1040, resource mappers 1050, and signal generators 1060. An operation/function of FIG. 23 may be performed, without being limited to, the processors 102 and 202 and/or the transceivers 106 and 206 of FIG. 22. Hardware elements of FIG. 23 may be implemented by the processors 102 and 202 and/or the transceivers 106 and 206 of FIG. 22. For example, blocks 1010 to 1060 may be implemented by the processors 102 and 202 of FIG. 22.

Alternatively, the blocks 1010 to 1050 may be implemented by the processors 102 and 202 of FIG. 22 and the block 1060 may be implemented by the transceivers 106 and 206 of FIG. 22.

Codewords may be converted into radio signals via the signal processing circuit 1000 of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

Specifically, the codewords may be converted into scrambled bit sequences by the scramblers 1010. Scramble sequences used for scrambling may be generated based on an initialization value, and the initialization value may include ID information of a wireless device. The scrambled bit sequences may be modulated to modulation symbol sequences by the modulators 1020. A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper 1030. Modulation symbols of each transport layer may be mapped (precoded) to corresponding antenna port(s) by the precoder 1040. Outputs z of the precoder 1040 may be obtained by multiplying outputs y of the layer mapper 1030 by an N*M precoding matrix W. Herein, N is the number of antenna ports and M is the number of transport layers. The precoder 1040 may perform precoding after performing transform precoding (e.g., DFT) for complex modulation symbols. Alternatively, the precoder 1040 may perform precoding without performing transform precoding.

The resource mappers 1050 may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators 1060 may generate radio signals from the mapped modulation symbols and the generated radio signals may be transmitted to other devices through each antenna. For this purpose, the signal generators 1060 may include Inverse Fast Fourier Transform (IFFT) modules, Cyclic Prefix (CP) inserters, Digital-to-Analog Converters (DACs), and frequency up-converters.

Signal processing procedures for a signal received in the wireless device may be configured in a reverse manner of the signal processing procedures 1010 to 1060 of FIG. 23. For example, the wireless devices (e.g., 100 and 200 of FIG. 22) may receive radio signals from the exterior through the antenna ports/transceivers. The received radio signals may be converted into baseband signals through signal restorers. To this end, the signal restorers may include frequency downlink converters, Analog-to-Digital Converters (ADCs), CP remover, and Fast Fourier Transform (FFT) modules. Next, the baseband signals may be restored to codewords through a resource demapping procedure, a postcoding procedure, a demodulation processor, and a descrambling procedure. The codewords may be restored to original information blocks through decoding. Therefore, a signal processing circuit (not illustrated) for a reception signal may include signal restorers, resource demappers, a postcoder, demodulators, descramblers, and decoders.

Figure 24:
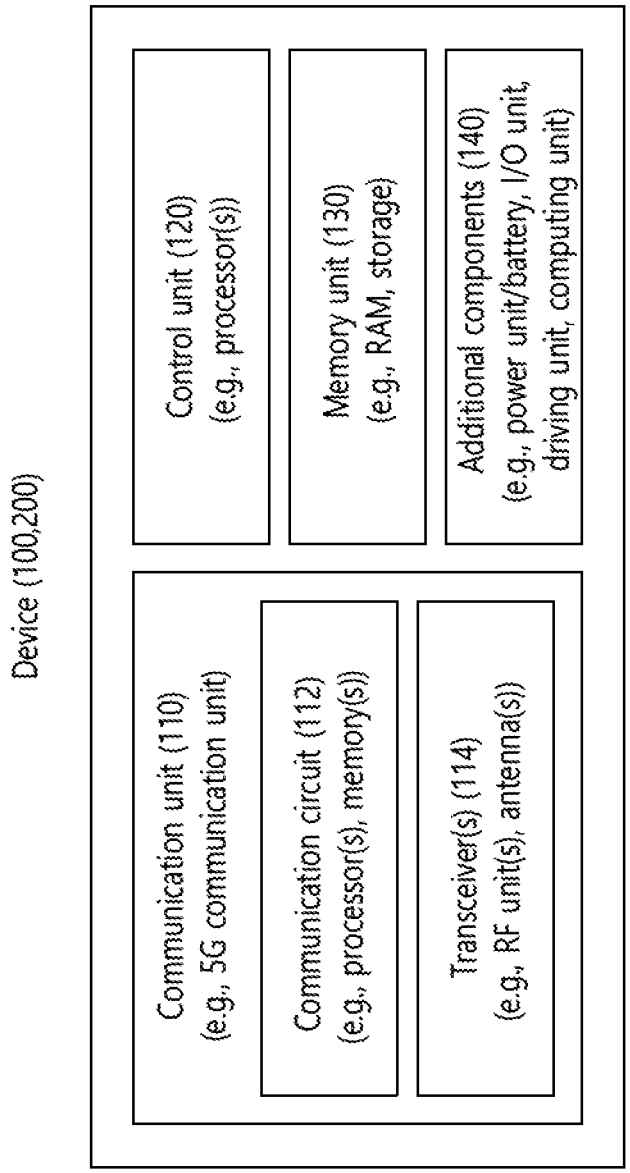
FIG. 24 shows a wireless device, in accordance with an embodiment of the present disclosure.

FIG. 24 shows another example of a wireless device, in accordance with an embodiment of the present disclosure. The wireless device may be implemented in various forms according to a use-case/service (refer to FIG. 21).

Referring to FIG. 24, wireless devices 100 and 200 may correspond to the wireless devices 100 and 200 of FIG. 22 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 22. For example, the transceiver(s) 114 may include the one or more transceivers 106 and 206 and/or the one or more antennas 108 and 208 of FIG. 22. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 21), the vehicles (100b-1 and 100b-2 of FIG. 21), the XR device (100c of FIG. 21), the hand-held device (100d of FIG. 21), the home appliance (100e of FIG. 21), the IoT device (100f of FIG. 21), a digital broadcast terminal, a hologram device, a public safety device, an MTC device, a medicine device, a fintech device (or a finance device), a security device, a climate/environment device, the AI server/device (400 of FIG. 21), the BSs (200 of FIG. 21), a network node, etc. The wireless device may be used in a mobile or fixed place according to a use-example/service.

In FIG. 24, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
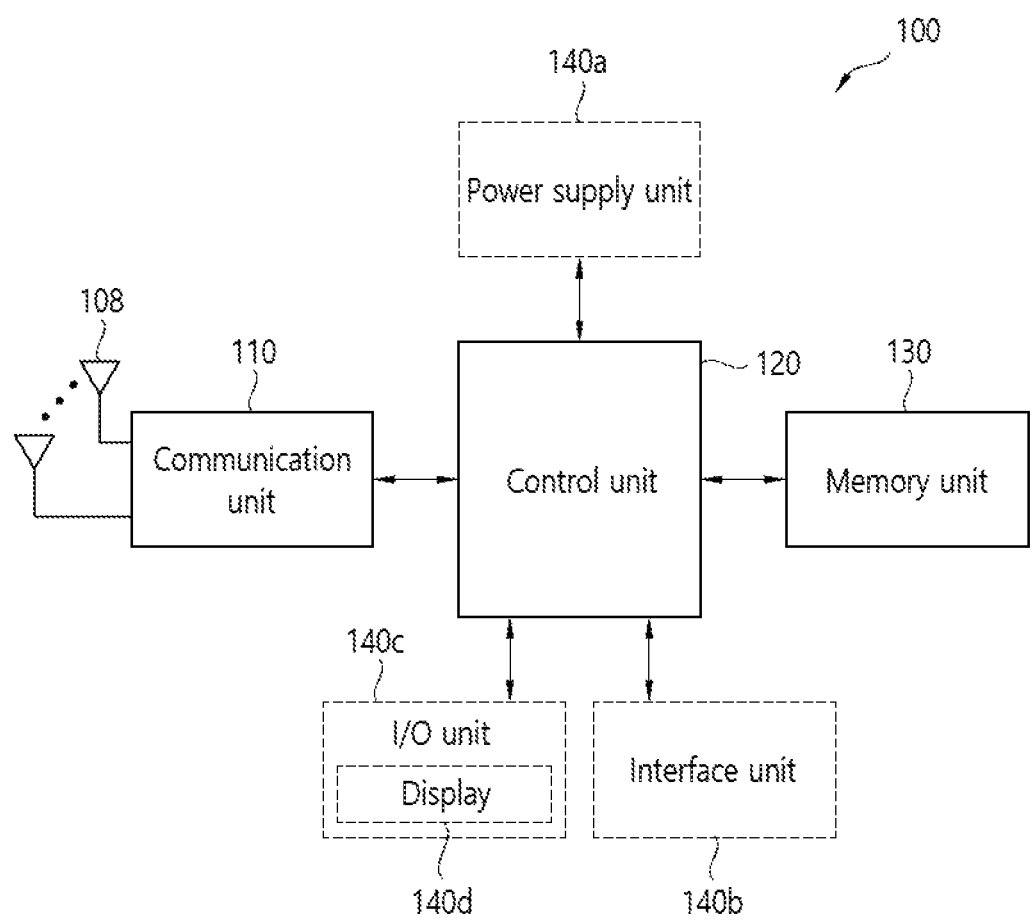
FIG. 25 shows a hand-held device, in accordance with an embodiment of the present disclosure.

FIG. 25 shows a hand-held device, in accordance with an embodiment of the present disclosure. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device 100 may include an antenna unit 108, a communication unit 110, a control unit 120, a memory unit 130, a power supply unit 140a, an interface unit 140b, and an I/O unit 140c. The antenna unit 108 may be configured as a part of the communication unit 110. Blocks 110 to 130/140a to 140c correspond to the blocks 110 to 130/140 of FIG. 24, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an Application Processor (AP). The memory unit 130 may store data/parameters/programs/code/commands needed to drive the hand-held device 100. The memory unit 130 may store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection with external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may convert the information/signals stored in the memory into radio signals and transmit the converted radio signals to other wireless devices directly or to a BS. The communication unit 110 may receive radio signals from other wireless devices or the BS and then restore the received radio signals into original information/signals. The restored information/signals may be stored in the memory unit 130 and may be output as various types (e.g., text, voice, images, video, or haptic) through the I/O unit 140c.

Figure 26:
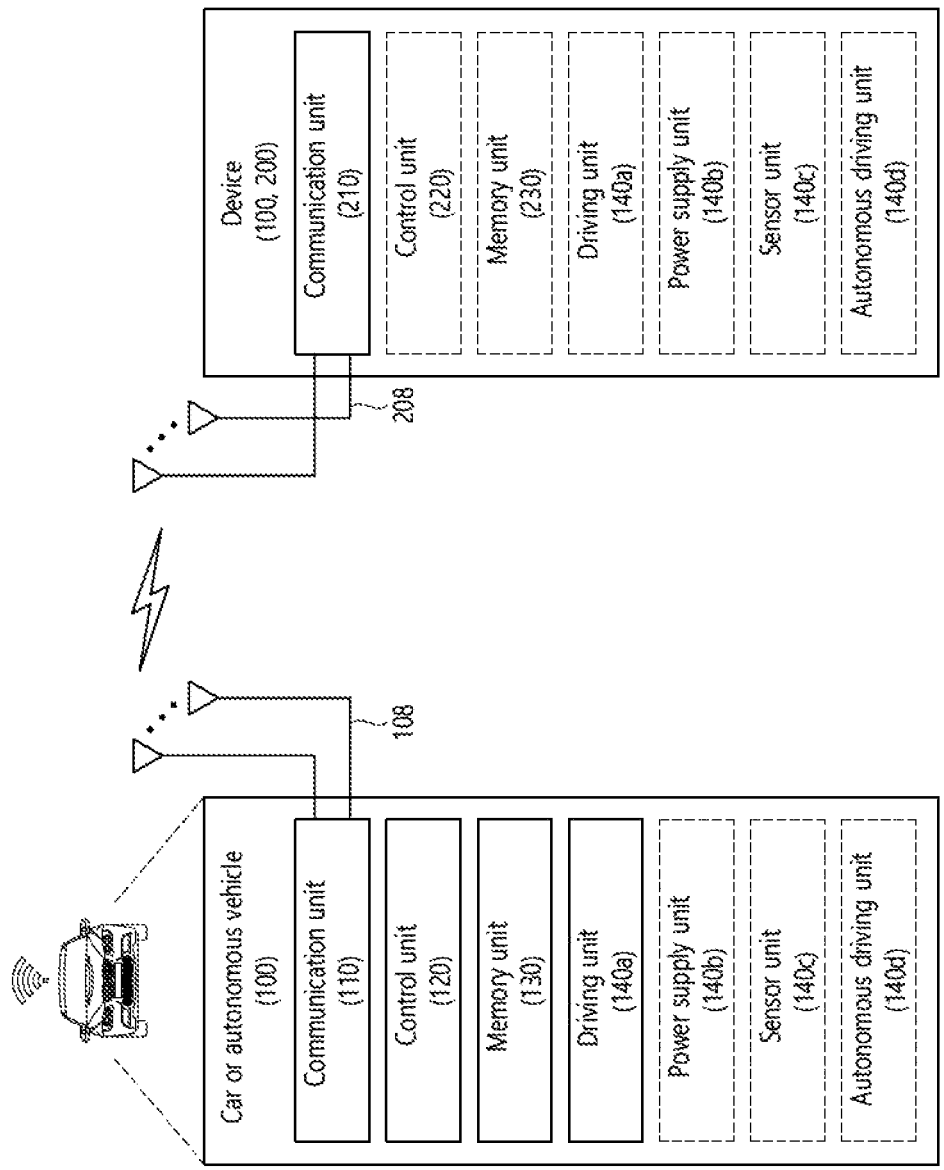
FIG. 26 shows a car or an autonomous vehicle, in accordance with an embodiment of the present disclosure.

FIG. 26 shows a vehicle or an autonomous vehicle, in accordance with an embodiment of the present disclosure. The vehicle or autonomous vehicle may be implemented by a mobile robot, a car, a train, a manned/unmanned Aerial Vehicle (AV), a ship, etc.

Referring to FIG. 26, a vehicle or autonomous vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 24, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous vehicle 100. The control unit 120 may include an Electronic Control Unit (ECU). The driving unit 140*a* may cause the vehicle or the autonomous vehicle 100 to drive on a road. The driving unit 140*a* may include an engine, a motor, a powertrain, a wheel, a brake, a steering device, etc. The power supply unit 140*b* may supply power to the vehicle or the autonomous vehicle 100 and include a wired/wireless charging circuit, a battery, etc. The sensor unit 140*c* may acquire a vehicle state, ambient environment information, user information, etc. The sensor unit 140*c* may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140*d* may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140*d* may generate an autonomous driving path and a driving plan from the obtained data. The control unit 120 may control the driving unit 140*a* such that the vehicle or the autonomous vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140*c* may obtain a vehicle state and/or surrounding environment information. The autonomous driving unit 140*d* may update the autonomous driving path and the driving plan based on the newly obtained data/information. The communication unit 110 may transfer information on a vehicle position, the autonomous driving path, and/or the driving plan to the external server. The external server may predict traffic information data using AI technology, etc., based on the information collected from vehicles or autonomous vehicles and provide the predicted traffic information data to the vehicles or the autonomous vehicles.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method in which a first apparatus performs wireless communication, the method comprising:
    receiving, from a base station, first information related to a set of resource blocks (RBs) available for the first apparatus to transmit a physical sidelink feedback channel (PSFCH) and second information related to a number of cyclic shifts available for the first apparatus to transmit the PSFCH;
    receiving, from a second apparatus, a physical sidelink shared channel (PSSCH);
    determining a PSFCH resource related the PSSCH, based on the first information related to the set of RBs and the second information related to the number of cyclic shifts; and
    transmitting, to the second apparatus, Hybrid Automatic Repeat Request (HARQ) information based on the PSFCH resource.

2. The method of claim 1, wherein the HARQ information is transmitted by using the PSFCH resource to the second apparatus.

3. The method of claim 1, further comprising:
    applying one cyclic shift among the number of cyclic shifts to the HARQ information.

4. The method of claim 3, wherein the number of cyclic shifts is a number of cyclic shift pairs.

5. The method of claim 1, wherein the set of RBs available to transmit the PSFCH is configured for the first apparatus in a resource pool.

6. The method of claim 1, wherein the first information related to the set of RBs available to transmit the PSFCH is a bitmap.

7. The method of claim 6, wherein each bit of the bitmap indicates each RB in a resource pool.

8. The method of claim 7, wherein an RB related to 1 of the bitmap is an RB available to transmit the PSFCH, and an RB related to 0 of the bitmap is an RB unavailable to transmit the PSFCH.

9. The method of claim 1, further comprising:
    receiving, from the base station, third information related to a slot available for the first apparatus to transmit the PSFCH.

10. The method of claim 1, further comprising:
    receiving, from the base station, fourth information related to a PSFCH format available for the first apparatus to transmit the PSFCH.

11. The method of claim 1, wherein the PSSCH includes a plurality of PSSCHs.

12. The method of claim 11, wherein a resource used by the first apparatus to transmit the PSFCH is a PSFCH resource related to a last received PSSCH among the plurality of PSSCHs received by the first apparatus.

13. A first apparatus configured to perform wireless communication, the first apparatus comprising:
    one or more memories storing instructions;
    one or more transceivers; and
    one or more processors connected to the one or more memories and the one or more transceivers,
    wherein based on the one or more processors executing the instructions, the one or more processors control the first apparatus to:
    receive, from a base station, first information related to a set of resource blocks (RBs) available for the first apparatus to transmit a physical sidelink feedback channel (PSFCH) and second information related to a number of cyclic shifts available for the first apparatus to transmit the PSFCH;
    receive, from a second apparatus, a physical sidelink shared channel (PSSCH);
    determine a PSFCH resource related the PSSCH, based on the first information related to the set of RBs and the second information related to the number of cyclic shifts; and transmit, to the second apparatus, Hybrid Automatic Repeat Request (HARQ) information based on the PSFCH resource.

14. An apparatus configured to control a first user equipment (UE), the apparatus comprising:
one or more processors; and
one or more memories operatively connected to the one or more processors and storing instructions,
wherein based on the one or more processors executing the instructions, the one or more processors control the first UE to:
receive, from a base station, first information related to a set of resource blocks (RBs) available for the first UE to transmit a physical sidelink feedback channel (PSFCH) and second information related to a number of cyclic shifts available for the first UE to transmit the PSFCH;
receive, from a second UE, a physical sidelink shared channel (PSSCH);
determine a PSFCH resource related the PSSCH, based on the first information related to the set of RBs and the second information related to the number of cyclic shifts; and
transmit, to the second UE, Hybrid Automatic Repeat Request (HARQ) information based on the PSFCH resource.

* * * * *